US012062859B2

(12) United States Patent
Malekzadeh et al.

(10) Patent No.: US 12,062,859 B2
(45) Date of Patent: Aug. 13, 2024

(54) TRUE TIME PHASE SHIFTER FOR MM-WAVE RADIO

(71) Applicant: QUALCOMM Incorporated, San Diego, CA (US)

(72) Inventors: Foad Arfaei Malekzadeh, San Diego, CA (US); Jeremy Darren Dunworth, La Jolla, CA (US); Shihchieh Chien, Santa Barbara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/485,216

(22) Filed: Sep. 24, 2021

(65) Prior Publication Data

US 2023/0100894 A1 Mar. 30, 2023

(51) Int. Cl.
*H01Q 3/26* (2006.01)
*H01Q 3/36* (2006.01)

(52) U.S. Cl.
CPC ............ *H01Q 3/2694* (2013.01); *H01Q 3/36* (2013.01)

(58) Field of Classification Search
CPC .......... H01Q 3/36; H01Q 3/38; H01Q 3/2694; H01P 1/18; H01P 1/182; H01P 1/184;
(Continued)

(56) References Cited

U.S. PATENT DOCUMENTS 3,295,138 A * 12/1966 Nelson ................. H01Q 3/2682 327/263
3,400,405 A * 9/1968 Patterson, Jr. ....... H01Q 3/2682 343/754

(Continued)

FOREIGN PATENT DOCUMENTS

FR 2606557 A1 * 5/1988 .............. H01P 1/185
FR 2606557 A1 5/1988

(Continued)

OTHER PUBLICATIONS

Lee W., et al., "Continuous True-Time Delay Phase Shifter Using Distributed Inductive and Capacitive Miller Effect", IEEE Transactions on Microwave Theory and Techniques, vol. 67, No. 7, Jul. 2019, pp. 3053-3063.

(Continued)

*Primary Examiner* — Whitney Moore
(74) *Attorney, Agent, or Firm* — Haynes and Boone, LLP/Qualcomm Incorporated

(57) ABSTRACT

Aspects of the present disclosure includes a phase shifter that includes a first meandering transmission line having a first input configured to receive a first input signal and a first output configured to provide a first output signal; and a plurality of switches configured to adjust an effective electrical length of the first meandering transmission line. In some embodiments, a method for processing a millimeter wave communication signal in a phase-array antenna includes determining a phase shift appropriate for the millimeter wave communication signal; determining configuration of a plurality of switches configured to adjust an effective electrical length of a first meandering transmission line configured to receive the millimeter wave communication signal; and setting the plurality of switches.

19 Claims, 19 Drawing Sheets

(58) Field of Classification Search
CPC . H03H 7/18; H03H 7/20; H03H 11/20; H03H 11/16
See application file for complete search history.

(56) References Cited

U.S. PATENT DOCUMENTS

| | | | | |
|---|---|---|---|---|
| 4,586,047 | A * | 4/1986 | Inacker | H01P 1/185 333/156 |
| 4,635,062 | A * | 1/1987 | Bierig | H01Q 3/36 342/372 |
| 4,751,453 | A * | 6/1988 | Foti | H01P 1/185 323/212 |
| 5,629,553 | A | 5/1997 | Ikeda et al. | |
| 5,757,319 | A | 5/1998 | Loo et al. | |
| 6,313,793 | B1 * | 11/2001 | Brown | H01P 1/182 343/778 |
| 6,320,480 | B1 | 11/2001 | Kintis et al. | |
| 6,320,481 | B1 * | 11/2001 | Sharma | H01P 1/18 333/159 |
| 6,741,207 | B1 * | 5/2004 | Allison | H01P 1/184 333/164 |
| 7,190,322 | B2 * | 3/2007 | Apostolos | H01Q 1/362 343/745 |
| 7,205,937 | B2 * | 4/2007 | Hein | H01Q 3/22 342/372 |
| 7,795,991 | B2 * | 9/2010 | El Rai | H03H 7/185 455/73 |
| 7,932,765 | B2 * | 4/2011 | Kapusta | H03K 5/133 327/269 |
| 9,450,557 | B2 * | 9/2016 | Reiha | H03H 7/185 |
| 10,277,215 | B2 * | 4/2019 | Tsai | H03K 5/133 |
| 2009/0015349 | A1 * | 1/2009 | Ellis | H01P 1/203 333/164 |
| 2011/0249760 | A1 * | 10/2011 | Chrisikos | H01Q 9/14 455/67.11 |
| 2012/0286839 | A1 * | 11/2012 | Park | H03F 3/193 327/240 |
| 2020/0161760 | A1 * | 5/2020 | Domino | H01P 1/18 |
| 2020/0235472 | A1 * | 7/2020 | Cercelaru | H01Q 3/32 |
| 2022/0200560 | A1 * | 6/2022 | Azizi | H03H 7/20 |

FOREIGN PATENT DOCUMENTS

| | | | | |
|---|---|---|---|---|
| GB | 2425658 A | * | 11/2006 | H01Q 1/246 |
| WO | WO-2008056184 A1 | * | 5/2008 | H01P 1/184 |

OTHER PUBLICATIONS

Li Z., et al., "A 28GHz CMOS Differential Bi-Directional Amplifier for 5G NR", 2020 25th Asia and South Pacific Design Automation Conference (ASP-DAC), Jan. 13-16, 2020, pp. 5-6.
Ma Q., et al., "A 10-50GHz True-Time-Delay Phase Shifter with max 3.9% delay variation", 2014 IEEE Radio Frequency Integrated Circuits Symposium, IEEE, 2014, pp. 84-86.
Tousi Y., et al., "A Ka-band Digitally-Controlled Phase Shifter with Sub-degree Phase Precision", 2016 IEEE Radio Frequency Integrated Circuits Symposium (RFIC), IEEE, 2016, pp. 356-359.
Woods W.H., et al., "CMOS Millimeter Wave Phase Shifter Based on Tunable Transmission Lines" Proceedings of the IEEE 2013 Custom Integrated Circuits Conference, Sep. 22-25, 2013, 4 pages.
Partial International Search Report—PCT/US2022/042670—ISA/EPO—Nov. 16, 2022.
Bhonkar A.A., et al., "3 Bit Balanced Digital Phase Shifter Using Switch Mode Topology", 2016 International Conference on Automatic Control and Dynamic Optimization Techniques (ICACDOT), IEEE, Sep. 9, 2016, pp. 513-517, XP033076798, DOI:10.1109/ICACDOT.2016.7877638, Sections II-VII, Figures 5, 6.
International Search Report and Written Opinion—PCT/US2022/042670—ISA/EPO—Jan. 31, 2023.
Min B.W., et al., "Single-Ended and Differential Ka-Band BiCMOS Phased Array Front-Ends" IEEE Journal of Solid-State Circuits, IEEE, USA, vol. 43, No. 10, Oct. 1, 2008, pp. 2239-2250, XP011235948, ISSN: 0018-9200, DOI: 10.1109/JSSC.2008.2004336, Section II-VI, Figures 10-14, 24, 21.

* cited by examiner

802

TRUE TIME PHASE SHIFTER FOR MM-WAVE RADIO

FIELD

The present disclosure relates generally to electronics, and more specifically to True-Time phase shifters for millimeter (MM)-Wave Radio transmitters and receivers.

BACKGROUND

Wireless communication devices and technologies are becoming ever more prevalent. Wireless communication devices generally transmit and receive communication signals. A communication signal is typically processed by a variety of different components and circuits. In some modern communication systems, a communication beam may be formed and steered in one or more directions. One type of beam steering system uses what is referred to as phased array, or phased array antenna system. A phased array may use a number of different elements and antennas where each element may process a transmit and/or receive signal that is offset in phase by some amount, leading to different elements of a phased array system processing slightly phase-shifted versions of a transmit and/or a receive signal. A phased array system may produce narrow, steerable, highly directional communication beams. A phased array antenna system may also form part of a massive multiple-input, multiple-output (MIMO) system.

In systems operating in the range 52.6 to 114 GHz, commonly referred to as the FR4 frequency range, the maximum channel bandwidth is expected to be wide from 500 MHz to over 2.5 GHz. The lower range of FR4, e.g. from 52.6 to 71 GHz, can also be referred to as FR2 extended (FR2x). With carrier aggregation (CA) or channel bonding, the bandwidth may be even broader (up to about 8 GHz, for example) in this frequency range.

The beam direction from the phase antenna array is a function of frequency and, when operating with ideal phase shifters, the wide bandwidths in the FR4 frequency range can result in substantial beam squint. In general, the beam squint refers to variation of the beam direction across the bandwidth due to variations in the frequency. The beam direction is a function of frequency and, when using ideal phase shifters as discussed above, the beam direction can vary significantly across the bandwidth in the FR4 frequency range. This beam squint can complicate the calibration process and degrade operation of the transmitter and receiver. Further, phase shifter gain and phase may vary significantly by process, voltages, temperature, and frequency, which can also degrade operation of the system. Although some of this may be mitigated through base band processing, this approach is costly in terms of area and power and compensations could be process dependent and therefore total system complication will increase.

Typical monolithic millimeter-wave true time phase shifter solutions that have been proposed are three-fold: (1) switching explicitly between two transmission line lengths, mostly done in MEMS; (2) switching the electrical length of the line by changing the slow wave pattern ground shield (PGS); or phase interpolation by vector modulation. All of these approaches, however, result in occupation of large areas, even in the FR4 (>52.6 GHz) frequency band.

Consequently, there is a need for phase shifters that reduce beam squint while occupying small areas.

SUMMARY

Aspects of the present disclosure includes a phase shifter that includes a first meandering transmission line having a first input configured to receive a first input signal and a first output configured to provide a first output signal; and a plurality of switches configured to adjust an effective electrical length of the first meandering transmission line. In some embodiments, a method for processing a millimeter wave communication signal in a phase-array antenna includes determining a phase shift appropriate for the communication signal; determining configuration of a plurality of switches configured to adjust an effective electrical length of a first meandering transmission line configured to receive the millimeter wave communication signal; and setting the plurality of switches

BRIEF DESCRIPTION OF THE DRAWINGS

In the figures, like reference numerals refer to like parts throughout the various views unless otherwise indicated. For reference numerals with letter character designations such as "102*a*" or "102*b*", the letter character designations may differentiate two like parts or elements present in the same figure. Letter character designations for reference numerals may be omitted when it is intended that a reference numeral encompass all parts having the same reference numeral in all figures. Similarly, reference numbers with array designations such as "102-1" or "102-N" designate one element in an array of the same or similar elements. Array designations may be omitted when it is intended that a reference numeral encompass those elements having the same array designation.

DETAILED DESCRIPTION

Figure 1:
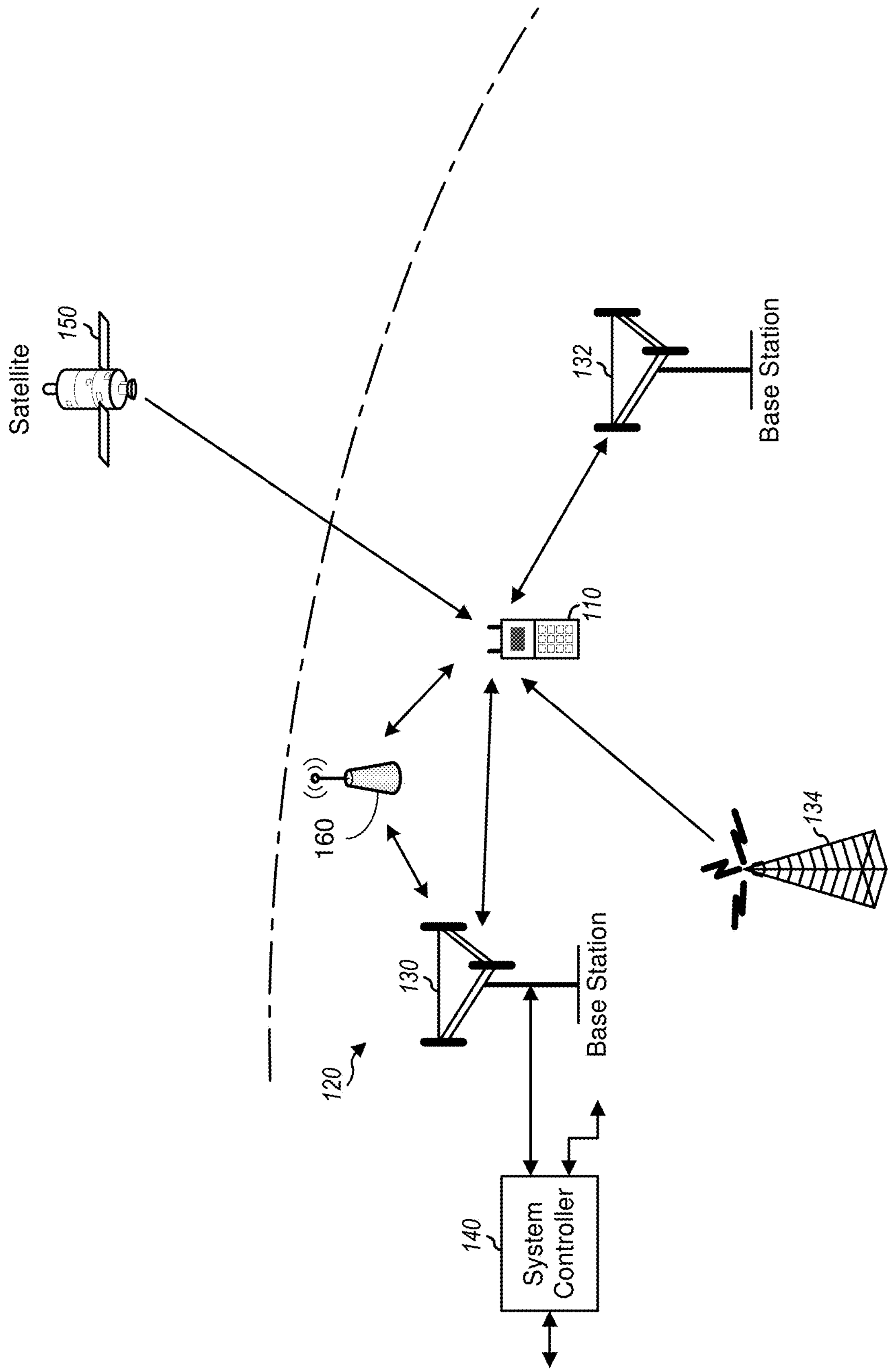
FIG. 1 is a diagram showing a wireless device communicating with a wireless communication system.

The word "exemplary" is used herein to mean "serving as an example, instance, or illustration." Any aspect described herein as "exemplary" is not necessarily to be construed as preferred or advantageous over other aspects.

Various examples of aspects of the following disclosure are provided below. Aspects of the disclosure provide for phase shift and phase array elements that reduce beam squint in providing and receiving mm-wave communications signals from with an antenna phase array. Aspects of the present disclosure utilize a true-time phase shifter where the true-time phase shifter includes a meandering transmission line and a plurality of switches configured to adjust the effective electrical length of the meandering transmission line. Such a configuration can form a first portion of the segment and may be combined with a second portion, which may be a mirror image of the first portion, configured to provide a single input phase shifter or a differential input phase shifter.

In this disclosure, a meandering transmission line is a transmission line that changes its direction a number of times along its length. The number of times the meandering transmission line changes direction can be any number greater than one (1). The meandering transmission line may include components such as one or more of the plurality of switches along its length to control the effective electrical length of the meandering transmission line.

Beam squint refers to a frequency-dependent distortion of the beam steering angle in phase-array antennas. As is discussed above, beam squint results in frequency dependent phase shifting that results from many previous phase shifter designs, which tend to have frequency dependent group delay.

In this disclosure, a true-time phase shifter refers to a phase shifter that adjust the transmission electrical length. Such true-time phase shifters can result in phase shifts that have consistent group delay across a wide frequency band. Such a system typically includes a tunable delay line, which intrinsically exhibits a constant group delay shift across frequency for a wide signal bandwidth. Such a system can delay in time domain, and thereby reduce or eliminate beam squint.

True-time phase shifters have been previously explored. However, these systems often use a large area to implement, typically involving switching between transmission lines of different length or different impedance characteristics. These systems often suffer from larger insertion loss and slow delay switching speeds. Examples of previous attempts at providing a True-Time Phase shifter are given in Wooram Lee and Alberto Veldes-Garcia, "Continuous True-Time Delay Phase Shifter Using Distributed Inductive and Capacitive Millser Effect," IEEE Transactions on Microwave Theory and Techniques, Vol. 67, No. 7, pg. 3053-3063 (July 2019) and Qian Ma, D. Leenaerts, and R. Mahmoudi, "A 10-50 GHz True-Time-Delay Phase Shifter with Max 3.9% delay variation," IEEE Transactions on Microwave Theory and Techniques, Vol. 67, No. 7, pg. 3053-3063 (July, 2019); and Yahya Tousi and Alberto Veldes-Garcia, "A Ka-band Digitally-Controlled Phase Shifter with sub-degree Phase Precision, 2016 IEEE Radio Frequency Integrated Circuits Symposium, pg. 356-359.

Aspects of the present disclosure can be used within any frequency range utilized by a 5G NR system or other such system. In some applications, these aspects may be useful for use in the FR4 (52.6 to 114 GHz) frequency ranges, where large bandwidths may result in significant beam squinting in other systems.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. The wireless communications system may also implement OFDMA, DFT-S-OFDM, CP-OFDM, Single Carrier QAM or other modulation schemes besides CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS), etc). Wireless device 110 may support one or more radio technologies for wireless communication such as LTE, WCDMA, CDMA 1X, EVDO, TD-SCDMA, GSM, 802.11, 5G, etc.

The wireless communication system 120 may also include a wireless device 160. In an exemplary embodiment, the wireless device 160 may be a wireless access point, or another wireless communication device that comprises, or comprises part of a wireless local area network (WLAN). In an exemplary embodiment, the wireless device 110 may be referred to as a customer premises equipment (CPE), which may be in communication with a base station 130 and a wireless device 110, or other devices in the wireless communication system 120. In some embodiments, the CPE may be configured to communicate with the wireless device 160 using WAN signaling and to interface with the base station 130 based on such communication instead of the wireless device 160 directly communicating with the base station 130. In exemplary embodiments where the wireless device 160 is configured to communicate using WLAN signaling, a WLAN signal may include WiFi, or other communication signals.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies.

Wireless device 110 may also be capable of communicating directly with other wireless devices without communicating through a network.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2A:
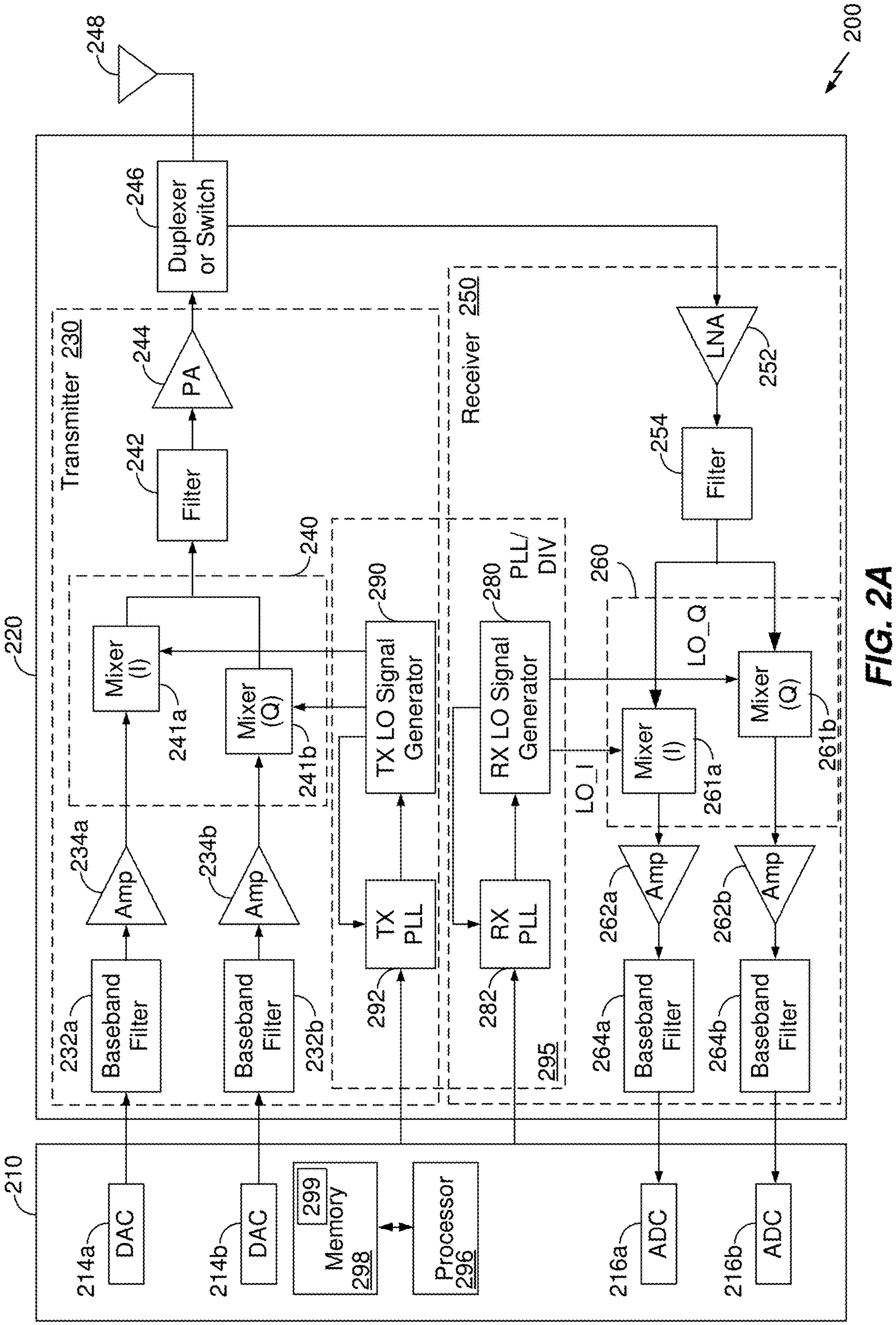
FIG. 2A is a block diagram showing a wireless device in which exemplary techniques of the present disclosure may be implemented.

FIG. 2A is a block diagram showing a wireless device 200 in which the exemplary techniques of the present disclosure may be implemented. The wireless device 200 may, for example, be an embodiment of the wireless device 110 illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250, for example phase shifters as discussed further below. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214*a* and 214*b* for converting digital signals generated by the data processor 210 into the I and Q analog output signals, e.g., I and Q output currents, for further processing. In other embodiments, the DACs 214*a* and 214*b* are included in the transceiver 220 and the data processor 210 provides data (e.g., for I and Q) to the transceiver 220 digitally.

Within the transmitter 230, lowpass filters 232*a* and 232*b* filter the I and Q analog transmit signals, respectively, to remove undesired images caused by the prior digital-to-analog conversion. Amplifiers (Amp) 234*a* and 234*b* amplify the signals from lowpass filters 232*a* and 232*b*, respectively, and provide I and Q baseband signals. An upconverter 240 having upconversion mixers 241*a* and 241*b* upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier (PA) 244 amplifies the signal from filter 242 to obtain the desired output power level and provides a transmit RF signal. The transmit RF signal is routed through a duplexer or switch 246 and transmitted via an antenna 248, or alternatively it can be sent to a separate transmit antenna different from a separate receive antenna. While examples discussed herein utilize I and Q signals, those of skill in the art will understand that components of the transceiver may be configured to utilize polar modulation.

In the receive path, antenna 248 receives communication signals and provides a received RF signal, which can be routed through duplexer or switch 246 and provided to a low noise amplifier (LNA) 252. The duplexer 246 is designed to operate with a specific RX-to-TX duplexer frequency separation, such that RX signals are isolated from TX signals. Alternatively, there may be a separate transmit antenna and separate receive antenna as mentioned above, in which case RX-to-TX isolation can be achieved through the limited coupling between the two antennas. In the case of separate RX and TX antennas, the RX antenna can be coupled directly to LNA 252. The received RF signal is amplified by LNA 252 and filtered by a filter 254 to obtain a desired RF input signal. Downconversion mixers 261*a* and 261*b* in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262*a* and 262*b* and further filtered by lowpass filters 264*a* and 264*b* to obtain I and Q analog input signals, which are provided to data processor 210. In the exemplary embodiment shown, the data processor 210 includes analog-to-digital-converters (ADC's) 216*a* and 216*b* for converting the analog input signals into digital signals to be further processed by the data processor 210. In some embodiments, the ADCs 216*a* and 216*b* are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

In an exemplary embodiment, the RX PLL 282, the TX PLL 292, the RX LO signal generator 280, and the TX LO signal generator 290 may alternatively be combined into a single LO generator circuit 295, which may include common or shared LO signal generator circuitry to provide the TX LO signals and the RX LO signals. Alternatively, separate LO generator circuits may be used to generate the TX LO signals and the RX LO signals.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the duplexer 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the filter 242, PA 244, LNA 252 and filter 254 may be implemented separately from other components in the transmitter 230 and receiver 250, and may be implemented on a millimeter wave integrated circuit. An example super-heterodyne architecture is illustrated in FIG. 2B.

Figure 2B:
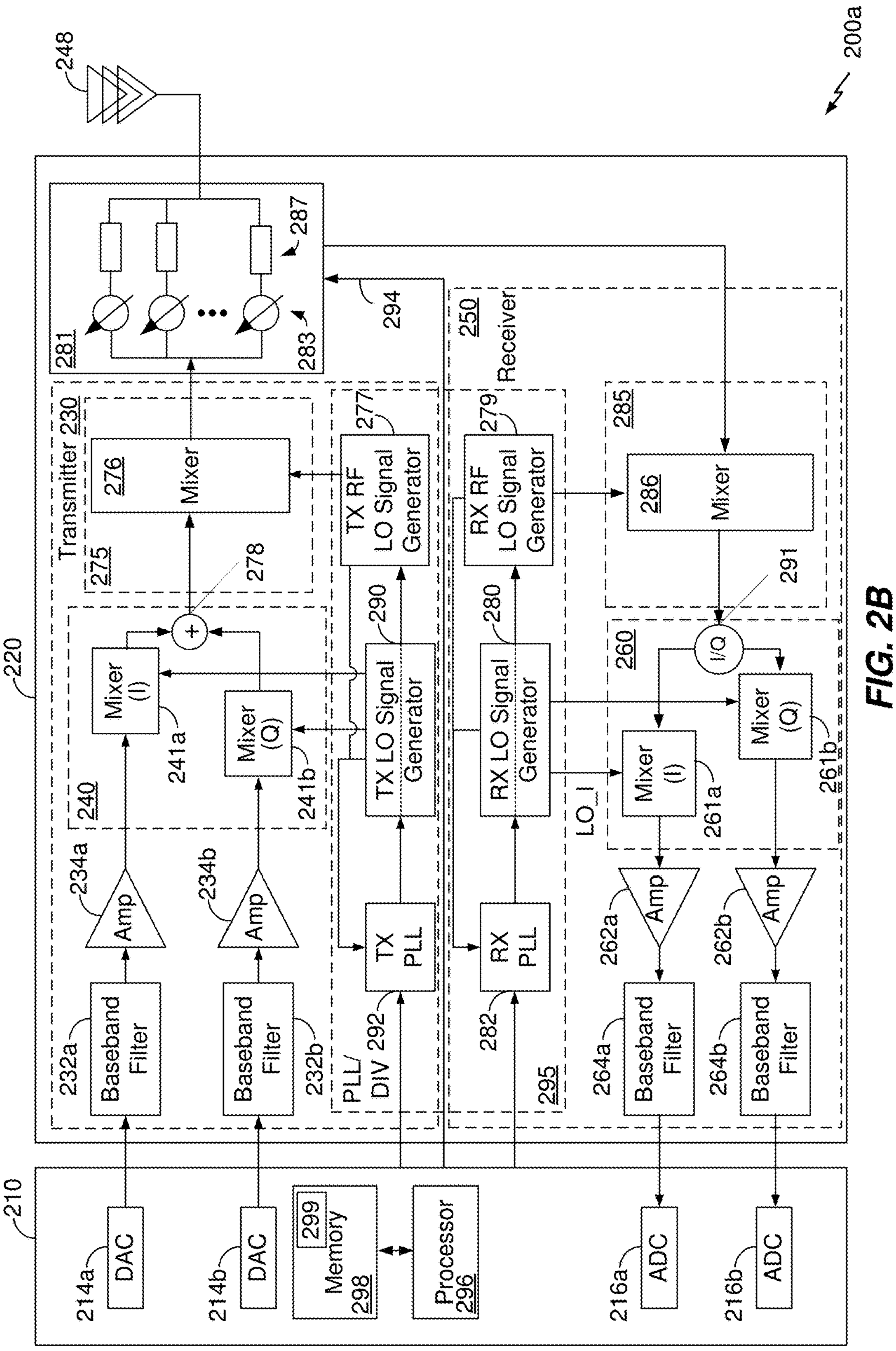
FIG. 2B is a block diagram showing a wireless device in which exemplary techniques of the present disclosure may be implemented.

FIG. 2B is a block diagram showing a wireless device in which the exemplary techniques of the present disclosure may be implemented. Certain components, for example which may be indicated by identical reference numerals, of the wireless device 200*a* in FIG. 2B may be configured similarly to those in the wireless device 200 shown in FIG. 2A and the description of identically numbered items in FIG. 2B will not be repeated.

The wireless device 200*a* is an example of a heterodyne (or superheterodyne) architecture in which the upconverter 240 and the downconverter 260 are configured to process a communication signal between baseband and an intermediate frequency (IF). For example, the upconverter 240 may be configured to provide an IF signal to an upconverter 275. In an exemplary embodiment, the upconverter 275 may comprise upconversion mixer 276. The summing function 278 of upconverter 240 combines the I and the Q outputs and provides a combined signal to the mixer 276. The combined signal may be single ended or differential. The mixer 276 is configured to receive the IF signal from the upconverter 240 and TX RF LO signals from a TX RF LO signal generator 277, and provide an upconverted RF signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 294 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the RF transmit signal from the upconverter 275, alter the phase by an amount, and provide the RF signal to a respective phased array element 287. Each phased array element 287 may comprise transmit and receive circuitry including one or more filters, amplifiers, driver amplifiers, and power amplifiers. In some embodiments, the phase shifters 283 may be incorporated within respective phased array elements 287.

The output of the phase shift circuitry 281 is provided to an antenna array 248. In an exemplary embodiment, the antenna array 248 comprises a number of antennas that typically correspond to the number of phase shifters 283 and phased array elements 287, for example such that each antenna element is coupled to a respective phased array element 287. In an exemplary embodiment, the phase shift circuitry 281 and the antenna array 248 may be referred to as a phased array.

In a receive direction, an output of the phase shift circuitry 281 is provided to a downconverter 285. In an exemplary embodiment, the downconverter 285 may comprise a downconversion mixer 286. In an exemplary embodiment, the mixer 286 downconverts the receive RF signal provided by the phase shift circuitry 281 to an IF signal according to RX RF LO signals provided by an RX RF LO signal generator 279. The I/Q generation function 291 of downconverter 260 receives the IF signal from the mixer 286 and generates I and Q signals in downconverter 260, which downconverts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antenna array 248 are included in a module, which may be coupled to other components of the transceiver 220 via a connector. In some embodiments, the phase shift circuitry 281, for example, a chip on which the phase shift circuitry 281 is implemented, is coupled to the antenna array 248 by an interconnect. For example, components of the antenna array 248 may be implemented on a substrate and coupled to an integrated circuit implementing the phase shift circuitry 281 via a flexible printed circuit.

In some embodiments, both the architecture illustrated in FIG. 2A and the architecture illustrated in FIG. 2B are implemented in the same device. For example, a wireless device 110 or 200 may be configured to communicate with signals having a frequency below about 7 GHz (e.g., the FR1 frequency band) using the architecture illustrated in FIG. 2A and to communicate with signals having a frequency above about 24 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from RF and signals that have been downconverted from RF to baseband via an IF stage may be filtered by the same baseband filter 264. In other embodiments, a first version of the filter 264 is included in the portion of the device which implements the architecture of FIG. 2A and a second version of the filter 264 is included in the portion of the device which implements the architecture of FIG. 2B.

Figure 3A:
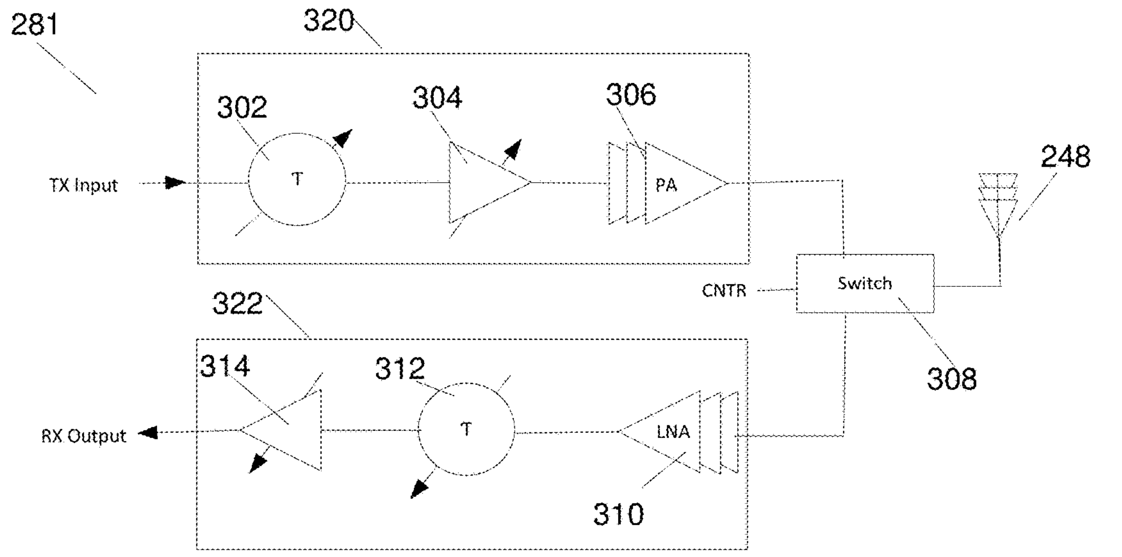
FIGS. 3A and 3B illustrate aspects of the phase shift and phase array elements as illustrated in FIG. 2B according to the present disclosure.
Figure 3B:
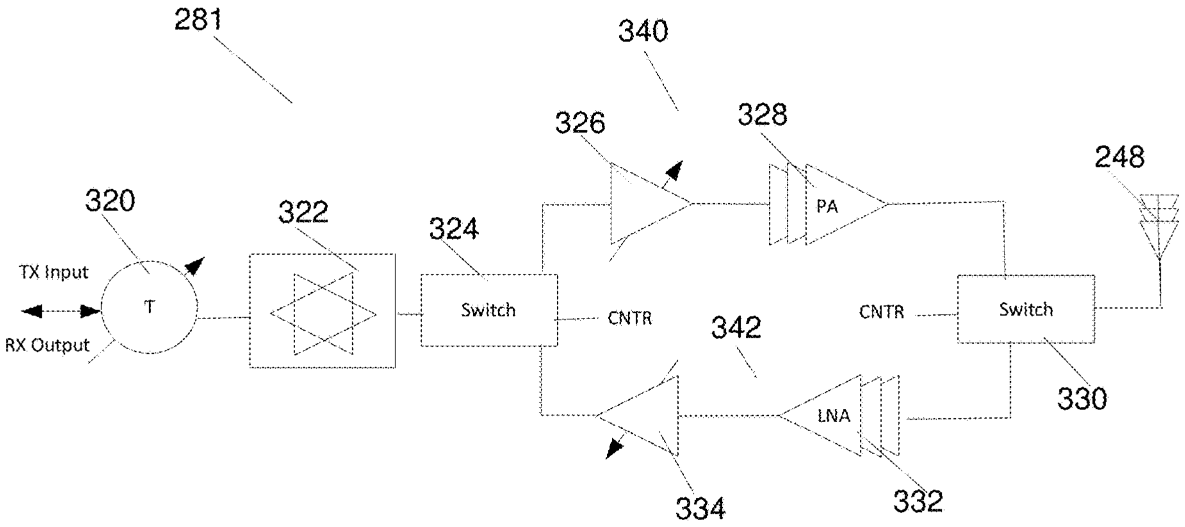

FIGS. 3A and 3B illustrate example implementations of components of phase shift circuitry 281 according to aspects of the present disclosure. FIGS. 3A and 3B illustrate one transmit/receive pair of components for phase shift circuitry 281. As illustrated in FIG. 2B, phase shift circuit 281 may include any number of pairs to process mm-wave communications signals.

As illustrated in FIG. 3A, phase shift circuitry 281 includes a transmit circuit 320 and a receive circuit 322. The transmit circuit 320 and receive circuit 322 are coupled to phased-array antennas 248 through a switch 308. Switch 308 is controlled to direct signals from transmit circuit 320 to antennas 248 or direct signals from antennas 248 to receive circuit 322, depending on whether phase shift circuitry 281 is operating in transmit mode or receive mode. Alternatively, antenna 248 may comprise separate transmit and receive antennas so that switch 308 can be omitted and transmit circuit 320 is coupled to transmit antennas while receive circuit 322 is coupled to receive antennas.

As is further illustrated in FIG. 3A, transmit circuit 320 includes series coupled true-time phase shifter 302 and power amplifiers (PA) 306. In some examples, an active phase shifter 304 may further be included. Active phase shifter 304 and true-time phase shifter 302 can be arranged in any order. As illustrated in the example of FIG. 3A, the transmitter (TX) input signal is received in true-time phase shifter 302 before being input to phase shifter 304 and amplified in amplifiers 306, then directed to antennas 248.

As illustrated in FIG. 3A, receive signals from switch 308 are received in low noise amplifiers (LNA) 310 before being passed to a true time phase shifter 314. In some examples, true time phase shifter 314 can be accompanied by an active phase shifter 314 to produce the receiver (RX) output signal.

FIG. 3B illustrates another example implementation where true-time phase shifter 320 is bi-directional. As illustrated in FIG. 3B, true-time phase shifter 320 is coupled to a bi-directional buffer 322. Bi-directional buffer 322 can pass signals in either direction so that TX signals are received by true-time phase shifter 320 and passed through bi-directional buffer 322 to switch 324 and RX signals are received from switch 324 through bi-directional buffer 322 to true-time phase shifter 320 to provide the RX output signal.

As is illustrated in FIG. 3B, switch 324 switches between a transmit path 340 and a receive path 342, depending on the operational mode of phase shift circuitry 281. Transmit path 340 can include an active phase shifter and/or variable gain amplifier 326 coupled to amplifiers 328. Receive path 342 can include amplifiers 332 coupled to active phase shifter and/or variable gain amplifier 334. Transmit path 340 and receive path 342 are coupled to switch 330, which itself is coupled to antennas 248. Consequently, in transmit mode switches 324 and 330 are set to use transmit path 340 and in receive mode switches 324 and 330 are set to use receive path 342.

Bi-directional buffer 322 can be, for example, similar to that described, for example, in Li et al., "A 28 GHz CMOS differential bi-directional amplifier for 5G NR," 978-1-7281-4123-7, IEEE (2020). In some embodiments, use of bi-directional buffer 322 can save power compared to an active phase shifter. The bi-directional buffer 322 can provide good gain. For example, a 14 dB gain, 4.2 db NF PA/LNA was realized in 65 nm CMOS technology as reported in Li et al.

The system illustrated in FIG. 3B saves area as it includes only one true-time phase shift delay instead of two such delays. FIG. 3A illustrates a system with separate TX and RX true time phase shifters, which uses more area.

In accordance with aspects of the present disclosure, the true time phase shifters 302 and 312 illustrated in FIG. 3A and the true-time phase shifter 320 illustrated in FIG. 3B include meandering transmission lines that are coupled to switches. As discussed below, the switches are configured to adjust the effective electrical length of the meandering transmission lines, either by controlling the actual physical length of the transmission lines or by inductively coupling impedance elements to the transmission lines. Example true-time phase shifters according to aspects of this disclosure are discussed in further detail below.

Figure 4A:
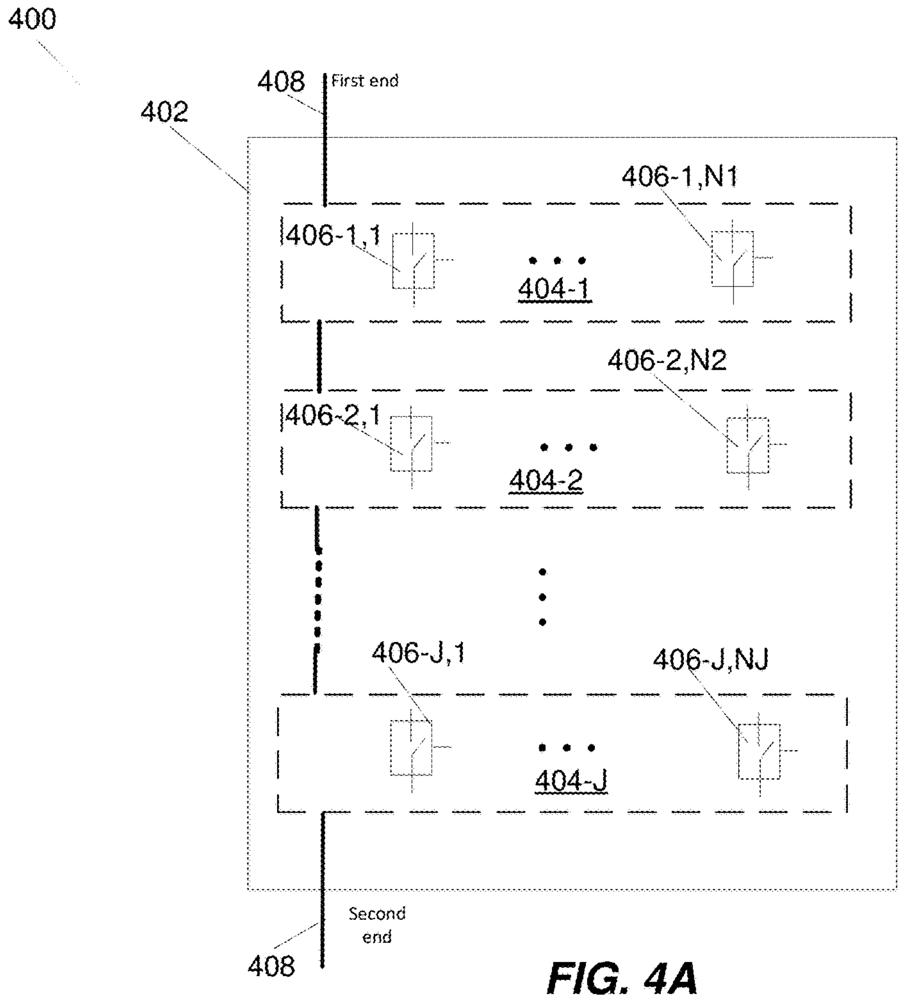
FIGS. 4A through 4C illustrate a true-time phase shifter as illustrated in FIGS. 3A and 3B.
Figure 4B:
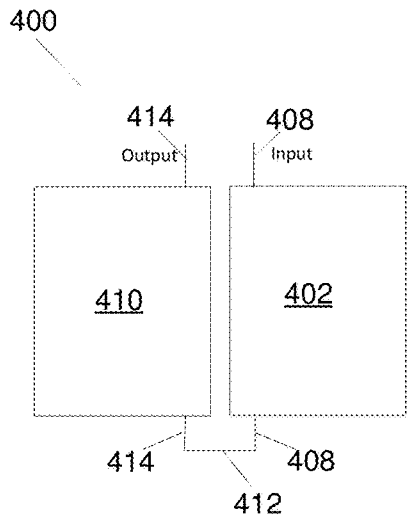
Figure 4C:
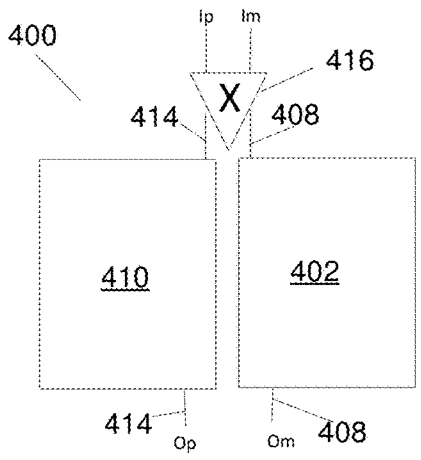

FIGS. 4A, 4B, and 4C illustrate true-time phase shifters 400 according to aspects of this disclosure. FIG. 4A illustrates a portion 402 of a true-time phase shifter 400. Portion 402 includes meandering transmission line 408 that is arranged to run through a cascaded array of segments 404-1 through 404-J between a first end of the meandering transmission line and a second end of the meandering transmission line. A phase shifter 400 includes portion 402, and may include other portions as described below. Meandering transmission line 408 is arranged to run through each of segments 404-1 through 404-J in a meandering fashion and therefore changes direction at least once in each of segments 404-1 through 404-J. A plurality of switches 406-1,1 through 406-J, NJ are distributed among segments 404-1 through 404-J such that the effective electrical length of meandering transmission line 408 can be adjusted in each of segments 404-1 through 404-J. In some embodiments, at least one of switches 406 is included in each segment (i.e. n≥1). In the notation illustrated in FIG. 4A, the switch 406-*j,n*, for example, indicates the nth switch in the jth segment 404-*j*, where j runs from 1 to J and n runs from 1 to Nj, Nj indicating the total number of switches in the jth segment.

As is illustrated in FIG. 4A, segments 404-1 through 404-J may be non-uniform and are cascaded to form portion 402, which itself can form a complete phase shifter 400. Each of segments 404-1 through 404-J may include a section of meandering transmission line having a different length and may include a different number of switches, which may themselves be of different sizes. In some aspects, each of segments 404-1 through 404-J can be optimized to provide a portion of the phase shift of phase shifter 400. In some aspects, insertion and return loss in each of segments 404-1 through 404-J can be optimized as well.

In some aspects, switches 406 can provide a capacitance when in the off state. In that fashion, switches 406 in the off state create a Coff capacitance and therefore meandering transmission line 408 can be optimized with a real impedance Zo of the sub segments that remains relatively constant when switches 406 are switched. This can provide a desired effective impedance ZO of meandering transmission line 408 when the configuration of switches 406 changes.

FIG. 4A illustrates a single-ended phase shifter 400. FIG. 4B illustrates another singled-ended phase shifter 400 with portion 402 as described above coupled and arranged with portion 410. Portion 410 can be similar to portion 402, which in some examples can be the mirror image of portion 402. In some examples portion 402 and portion 410 can be physically configured in such a way that fields generated in segments 404-1 through 404-J in portion 402 are at least partially canceled by fields generated in corresponding segments of portion 410. As such, in the example illustrated in FIG. 4B a single-ended input at the first end of meandering transmission line 408 provides a singled-ended output of meandering transmission line 408, which is connected directly to meandering transmission line 414 of portion 410 at connection 412 to form a single meandering transmission line that runs through both of portions 402 and 410. In some embodiments, a further single-ended 180° phase shifter can be included either on the input of phase shifter 400 or on the output of phase shifter 400, which can reduce the physical size of phase shifter 400.

FIG. 4C illustrates an example of a differential signal true-time phase shifter 400. As illustrated in FIG. 4C, portion 402 and portion 410, which may be a mirrored arrangement of portion 402, are arranged proximate to one another. A differential input signal (Ip, Im) is coupled into portion 402 and portion 410 resulting in a differential output signal (Op, Om). As illustrated, in some embodiments differential input signal (Ip, Im) may be input to portion 402 and mirror-image portion 410 through a cross switch 416, which introduces a 180° phase shift in the differential input signal (Ip, Im). Although illustrated on the input sides of portions 402 and 410, cross switch 416 may be arranged on the output sides of portions 402 and 410 instead. Again, although FIG. 4C illustrates an input signal and an output signal, phase shifter 400 may be configured to be a bidirectional phase shifter. In some embodiments, cross switch 416 can be implemented as an amplifier that can select between an inverting mode and a non-inverting mode.

As is illustrated in FIGS. 4A, 4B, 4C, aspects of the present disclosure are formed with a meandering transmission line that receives an input signal on one end and provides a phase-delayed output signal on the other end. Additionally, a plurality of switches are provided to adjust an effective electrical length of the meandering transmission line. As is further illustrated, the meandering transmission line can form a number of segments. The plurality of switches can include a switch in each segment to effectively control the length of the transmission line in the segment. Consequently, each of the segments can provide a programmed phase shift contribution in each segment. The phase shifter can include a first portion with a first meandering transmission line and a second portion that is a mirror image of the first portion. The first portion and the second portion can be connected to form a single-ended phase shifter or can be configured to support a differential signal.

Each of the switches may be arranged to provide a capacitance when in an off state so that an overall impedance of the meandering transmission line in each portion can be optimized with respect to total impedance during operation. Additionally, the thickness and shape of the meandering transmission line can be adjusted to optimize the total impedance. Further, since the dominant process variation stems from the switches, calibration may not be needed in these examples.

In some examples, the overall size of phase shifter 400 can be reduced using cross-switches or inverters (in single-ended systems) to provide a 180° phase shift. As a result of phase shifter 400 being a true-time phase shifter, the system can be operated without calibration because the dominant process variation in producing the phase shifter is from manufacturing variation in the fabrication of the switches.

Figure 4D:
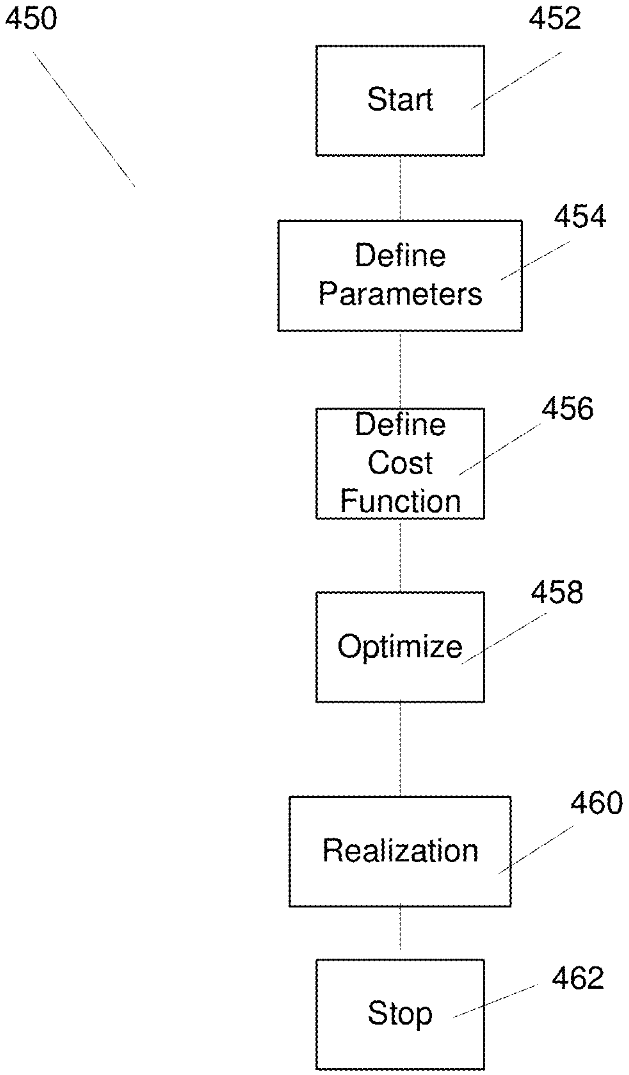
FIG. 4D illustrates a method of optimizing configuration of the true-time phase shifter as illustrated in FIGS. 4A, 4B, and 4C.

FIG. 4D illustrates an optimization method 450 for configuring a phase shifter 400 as is illustrated in FIGS. 4A through 4C. Method 450 starts in step 452, in which a general configuration of phase shifter 400 can be provided. Once the general configuration of phase shifter 400 is determined, then in step 454 the parameters to be adjusted in the optimization are defined. The parameters, which may be defined in ranges, include switch characteristics (e.g., on resistance Ron and off capacitance Coff), impedance of meandering transmission lines 408 and 414, line widths of meandering transmission lines 408 and 414, phase angle attained in each of segments 404 and each sub element of the segments 404, the frequency band of operation, inductances that may be switched, switching sequences, and other parameters. In step 456 a cost function is defined. The cost function in step 456 can include, for example, system specifications such as the overall phase to be achieved, the RMS gain variation, allowable phase errors, and other parameters.

In step 458, the optimization can be performed to determine configuration parameters such that phase shift 400 meets the specifications provided in the cost function. During optimization, the meandering transmission line 408 can be optimized with a physics-based mode and the S parameters determined. Switches 406 can be modelled with an Ron/Coff model. In some cases, the Ron-Coff product can be assumed to be about 120 fsec, for example.

In step 460, the design can be realized. The optimization method 450 ends in step 462. During the optimization method 450, the optimum characteristic impedances, the optimum switch sizes, and the optimum sequence in which to switch switches 406 between states can be determined. In some examples, the intrinsic line impedance and with along with the sizes of switches 406 may be varied along the length of meandering transmission line 408.

Consequently, in some examples, a true-time phase shifter such as phase shifter 400 described above can be optimized during design to avoid per-part calibrations. Phase shifter 400 may lend itself to production with processes with good thick metals and high RF switching performance (e.g., silicon-on-insulator (SOI) CMOS process with thick metal back-end-of-line (BEOL) processing. The performance can be optimized by various techniques during design as described above with respect to FIG. 4D. Further, phase shifter 400 can be shared between transmit and receive channels, further optimizing the area occupied by the phase shifter.

Figure 5A:
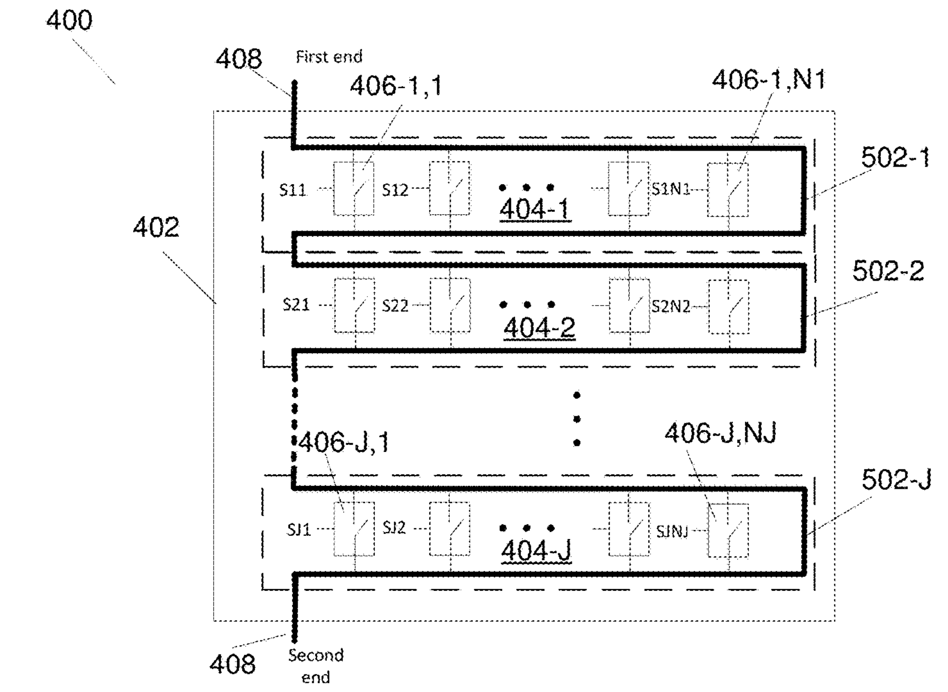
FIGS. 5A through 5C illustrate an example of a true-time phase shifter as illustrated in FIGS. 4A through 4C.
Figure 5B:
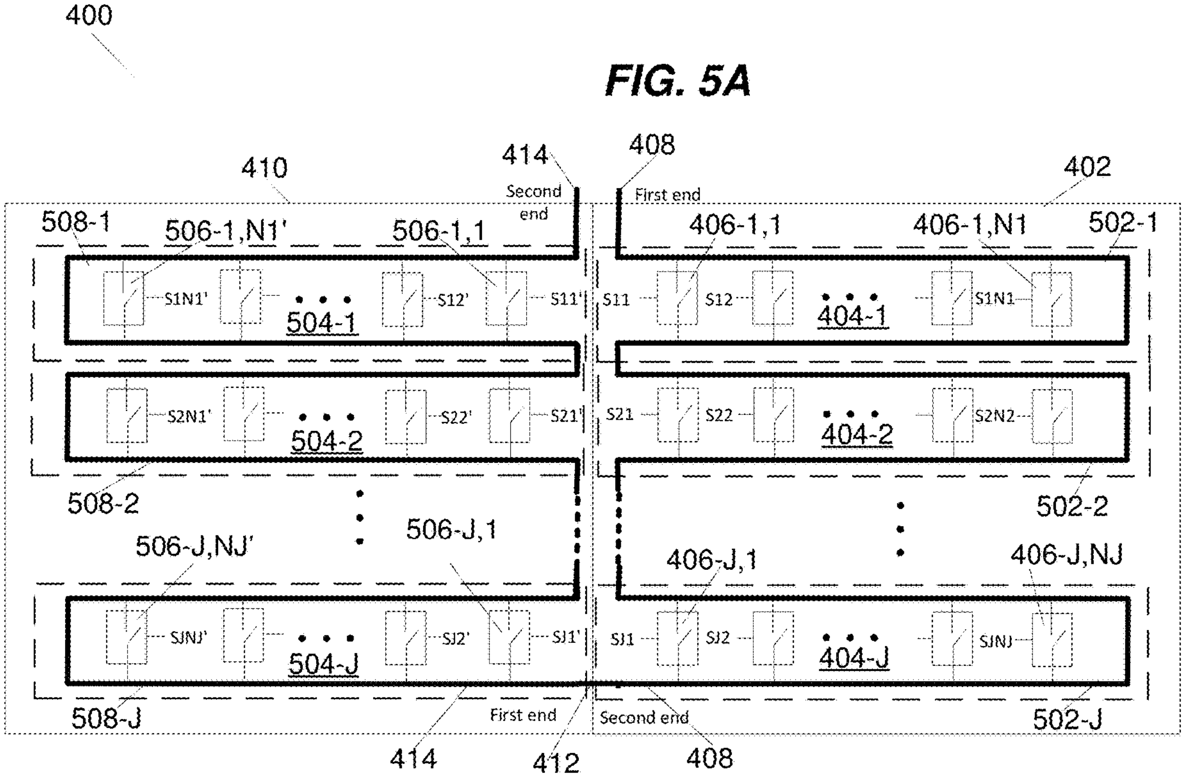
Figure 5C:
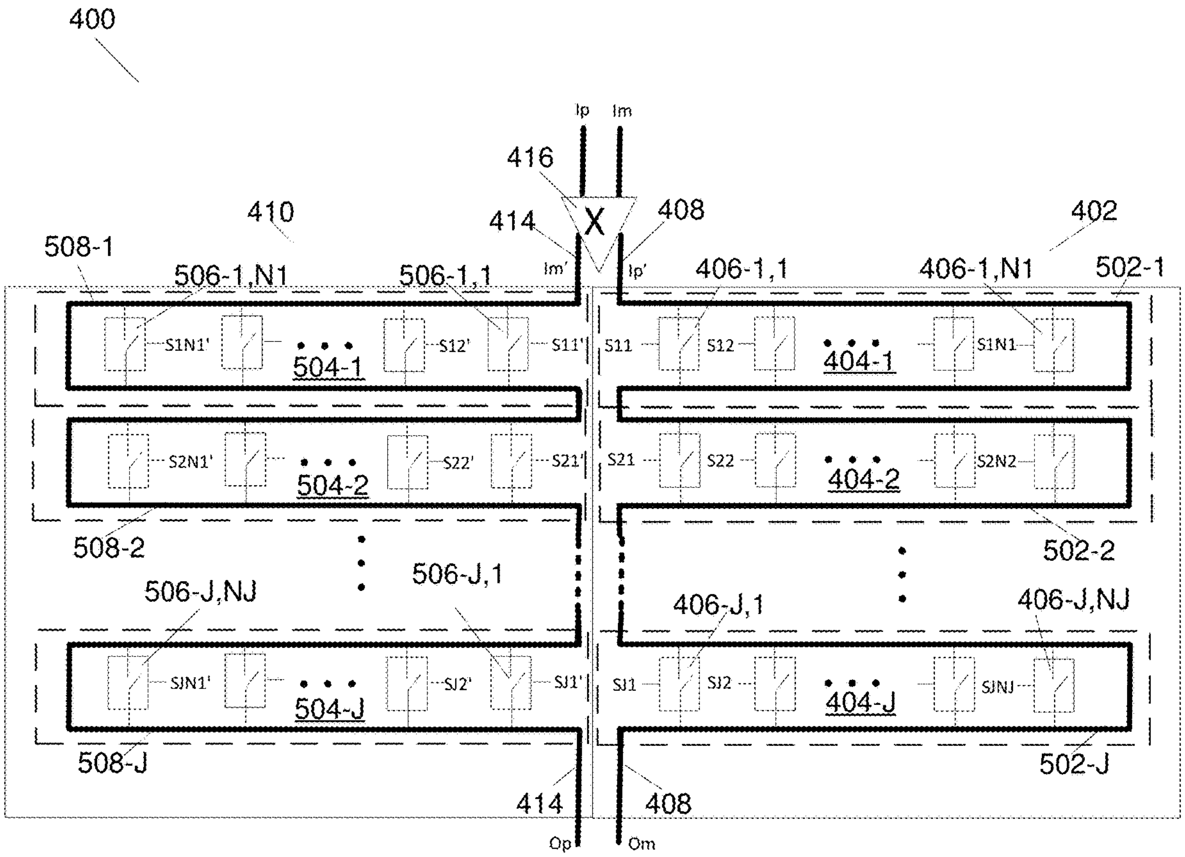

FIGS. 5A, 5B, and 5C illustrate an example planar layout of a true-time phase shifter 400 as illustrated in FIGS. 4A, 4B, and 4C, respectively. FIG. 5A illustrates an example of portion 402 of phase shifter 400 where meandering transmission line 408 forms a "U-Shaped" section 502 in each of segments 404. As illustrated, in segment 404-1 meandering transmission line 408 forms a U-shape 502-1; in segment 404-2 meandering transmission line 408 forms a U-shape 502-2; and in segment 404-J meandering transmission line 408 forms a U-shape 502-J.

As is illustrated in FIG. 5A, each of segments 404-1 through 404-J includes at least one of switches 406 that is positioned to adjust the length of the "U" in the U-shaped segment of each of U-shaped sections 502 of meandering transmission line 408. As illustrated in FIG. 5A, switches 406-1,1 through 406-J, NJ can be independently activated by control signals S11 through SJNJ, respectively. As discussed above, J indicates the number of segments 404 and can be any integer greater than 1. Nj indicates the number of switches in the jth segment and can be any integer greater than 1. In some examples, activation of switches 406-1,1 through 406-J, NJ, controlled with signals S11 through SJNJ, respectively, can be optimized, as is further discussed below.

It should be noted in FIG. 5A, that although one end of meandering transmission line 408 receives an input signal and the opposite end provides an output signal. In some examples, true-time phase shifter 400 may be bi-directional in that signals may be received at either end of meandering transmission line 408 and transmitted to the opposite side of meandering transmission line 408.

FIG. 5B illustrates a single-ended phase shifter 400 such as that illustrated in FIG. 4B, with portion 402 as illustrated in FIG. 5A combined with portion 410. As is illustrated in FIG. 5A, meandering transmission line 408 of portion 402, as illustrated in FIG. 5A, is connected with meandering transmission line 414 of portion 410 at connection 412 to form a single meandering transmission line that runs through both of portions 410 and 402. As is illustrated in FIG. 5B portion 410 includes segments 504-1 through 504-J. In each of segments 504-1 through 504-J, meandering transmission line 414 is arranged in a "U-shaped" pattern 508-1 through 508-J, respectively. As is illustrated, switches 506-1,1 through 506-J, NJ' are arranged such that the U in each of "U-shaped" patterns 508-1 through 508-J can be shorted. As is further illustrated, each segment 504-1 through 504-J includes at least one switch 506. As is also illustrated, each of switches 506-1,1 through 506-SJNJ' is driven by a control signals S11' through SJNJ'. Segments 504-1 through 504-J can be configured differently than counterpart segments 404-1 through 404-J of portion 402. In some examples, however, segments 504-1 through 504-J can be mirror images of segments 404-1 through 404-J, respectively, so that portion 410 is a mirror image of portion 402. In some examples, fields created by current flowing through segments 404-1 through 404-J can at least be partially canceled by currents flowing through counterpart segments 504-1 through 504-J of portion 410.

FIG. 5C illustrates an example where portions 402 and 410 are configured to form a differential input true-time phase shifter 400. As is illustrated in FIG. 5C, meandering transmission line 408 of portion 402 and meandering transmission line 414 of portion 410 are configured to receive a differential input. In some embodiments, a cross-switch 416 can be configured to either receive the differential input or the differential output and provide an additional 180° phase shift. As discussed above, in some embodiments, phase shifter 400 may be a bi-directional phase shifter.

Figure 5D:
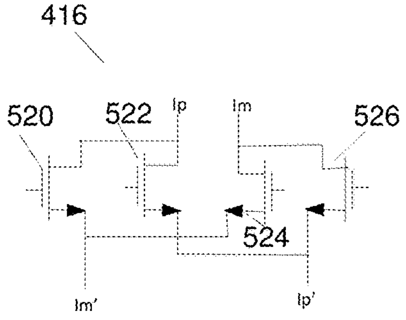
FIGS. 5D and 5E illustrate examples of cross switches as shown in the true-time phase shifters illustrated in FIGS. 5A, 5B, and 5C.
Figure 5F:
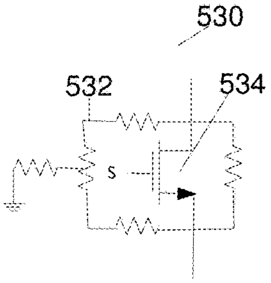
FIG. 5F illustrates an example switch as shown in the true-time phase shifters illustrated in FIGS. 5A, 5B, and 5C.
Figure 5E:
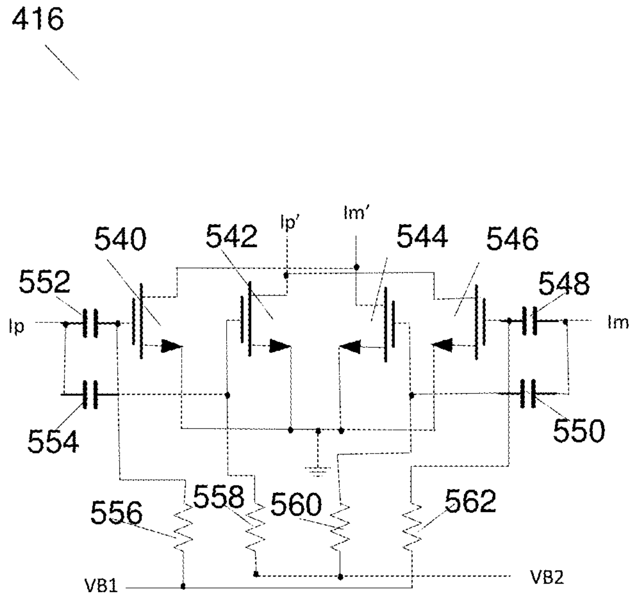

FIGS. 5D, 5E, and 5F illustrate additional components of phase shifter 400 illustrated in FIGS. 5A, 5B, and 5C. FIG. 5D illustrates an example of a cross switch 416 that can provide a 180° phase shift. In general, there are two types of topologies for phase inverter 416: active and passive. FIG. 5D illustrates a passive design while FIG. 5E illustrates an example active design. The example illustrated in FIG. 5D has a wide bandwidth but also comes with large losses that may be compensated for by a subsequent gain stage. In FIG. 5D, a passive cross-switch 416 is implemented with transistors 520, 522, 524, and 526 where the output of cross-switch 416 is the same as the input of cross switch 416 if transistors 522 and 524 are off and transistors 520 and 526 are on and where the output of cross-switch 416 is phase shifted from the input by 180° when transistors 522 and 524 are turned on and transistors 520 and 526 are turned off.

FIG. 5E illustrates an example of an active cross-switch. As is illustrated in FIG. 5E, differential input voltage (Ip, Im) is capacitively coupled to the gates of common source transistors. The voltage Ip is capacitively coupled through capacitors 552 and 554 to the gates of transistors 540 and 542, respectively. The voltage Im is capacitively coupled through capacitors 548 and 550 to the gates of transistors 546 and 544, respectively. The gates of transistors 540 and 546 are resistively coupled through resistances 556 and 562 to a bias voltage VB1. The gates of transistors 542 and 544 are resistively coupled through resistors 558 and 560, respectively, to a bias voltage VB2. The sources of transistors 540, 542, 544, and 546 are all coupled to ground. The drains of transistors 546 and 542 are coupled to provide the output voltage Ip' while the drains of transistors 540 and 544 are combined to provide the output voltage Im'. Either VB1 or VB2 is set to a bias voltage while the other is set to ground, so that one pair of transistors {540, 546} and {542, 544} are configured as common source amplifiers while the other pair is configured to be off. In this configuration, the off-state pair (whichever ones of transistors 540, 542, 544, and 546 is off) can provide capacitive neutralization to the differential output through their off-capacitance, which improves amplifier gain and stability. As a result, stabilization with the topology illustrated in FIG. 5E is better than a common-source stage without active cross switch functionality.

A similar cross-switch 416 as that illustrated in FIG. 5D can be provided with a matching network designed with gain and power gain (GA and GP) circles to form an active cross-switch 416. The differential design can include input and output matching circuits, for example, to 100 ohms or any other impedance. In one such design, simulated peak small signal gain is 5.8 dB at 144.4 GHz with 21 GHz 1-db bandwidth. Simulated noise figure is 5.4 dB and OP 1 db is −4.9 dBm. Saturated output power is −2.3 dBm and peak PAE is 12.2%. One skilled in the art will recognize other configurations of a cross switch 416 that can be used.

FIG. 5F illustrates a switch 530, which can be an example of one of switches 406 or 506. Switch 530 is resistively biased to ground with resistor array 532 and is formed by a transistor 534. Transistor 534 provides a capacitance when signal S turns transistor 534 off. One skilled in the art will recognize that other configurations can be formed to produce switch 530. In some embodiments, transistor 534 may be in series with a capacitance C (e.g., a MOMcap) such that when transistor 530 is on, switch 530 presents a series resistor and capacitor, and when transistor 534 is off, switch 530 presents series capacitances.

In one exemplary example of phase shifter 400 as illustrated in FIGS. 5A through 5C, portion 402 includes three identical segments 404-1 through 404-2, each including four switches 406. Portion 410 is a mirror image of portion 402. Such an arrangement can be readily produced with metallization layer with the meandering transmission line in a single layer and switches 406, with capacitances, can be formed in an underlying semiconductor layer and coupled with the meandering transmission line through vias.

Figure 6A:
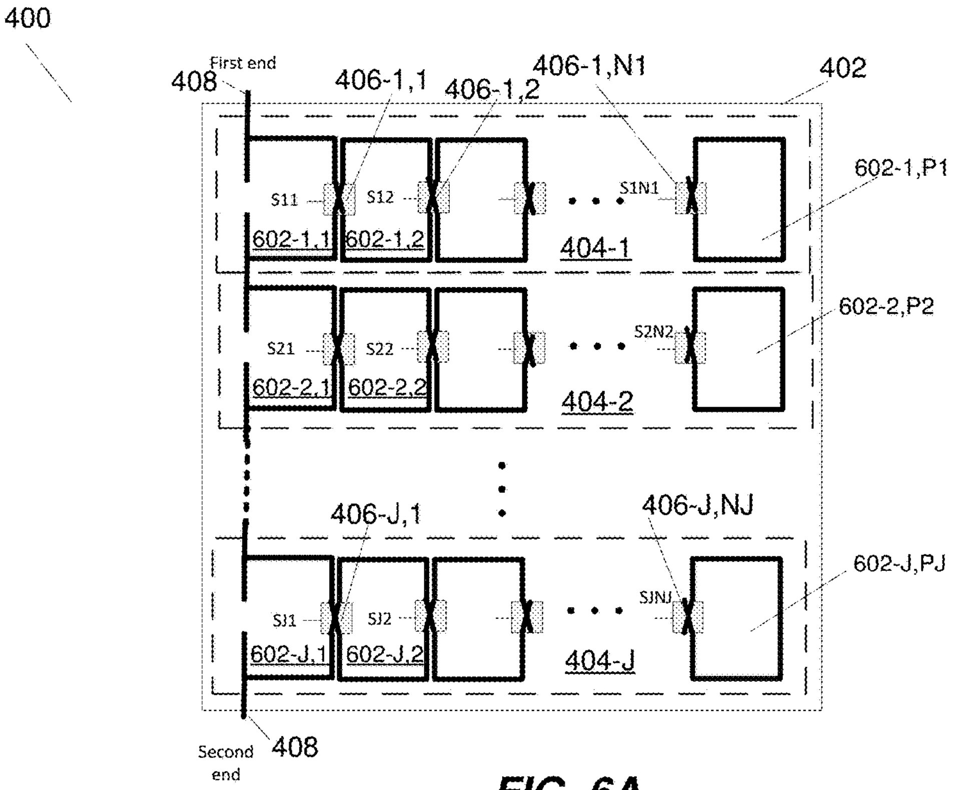
FIGS. 6A through 6C illustrate an example of a true-time phase shifter as illustrated in FIGS. 4A through 4C.
Figure 6B:
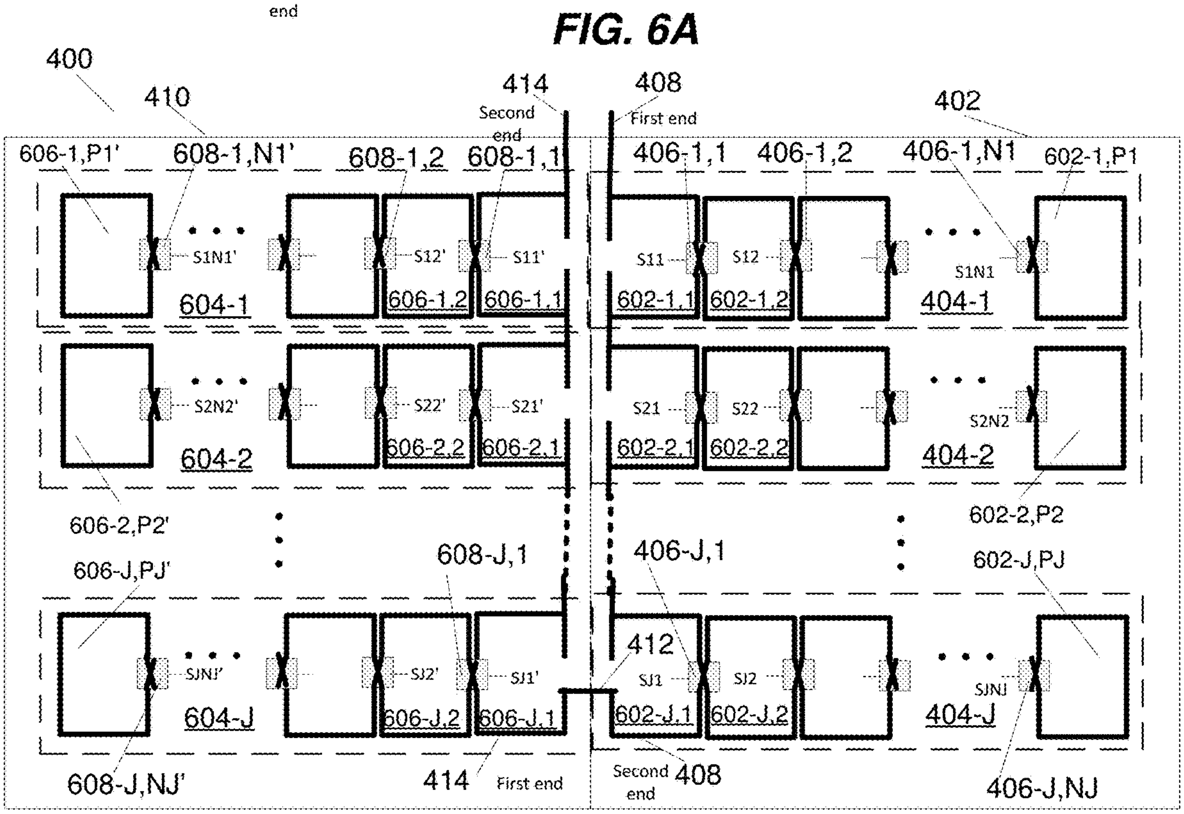
Figure 6C:
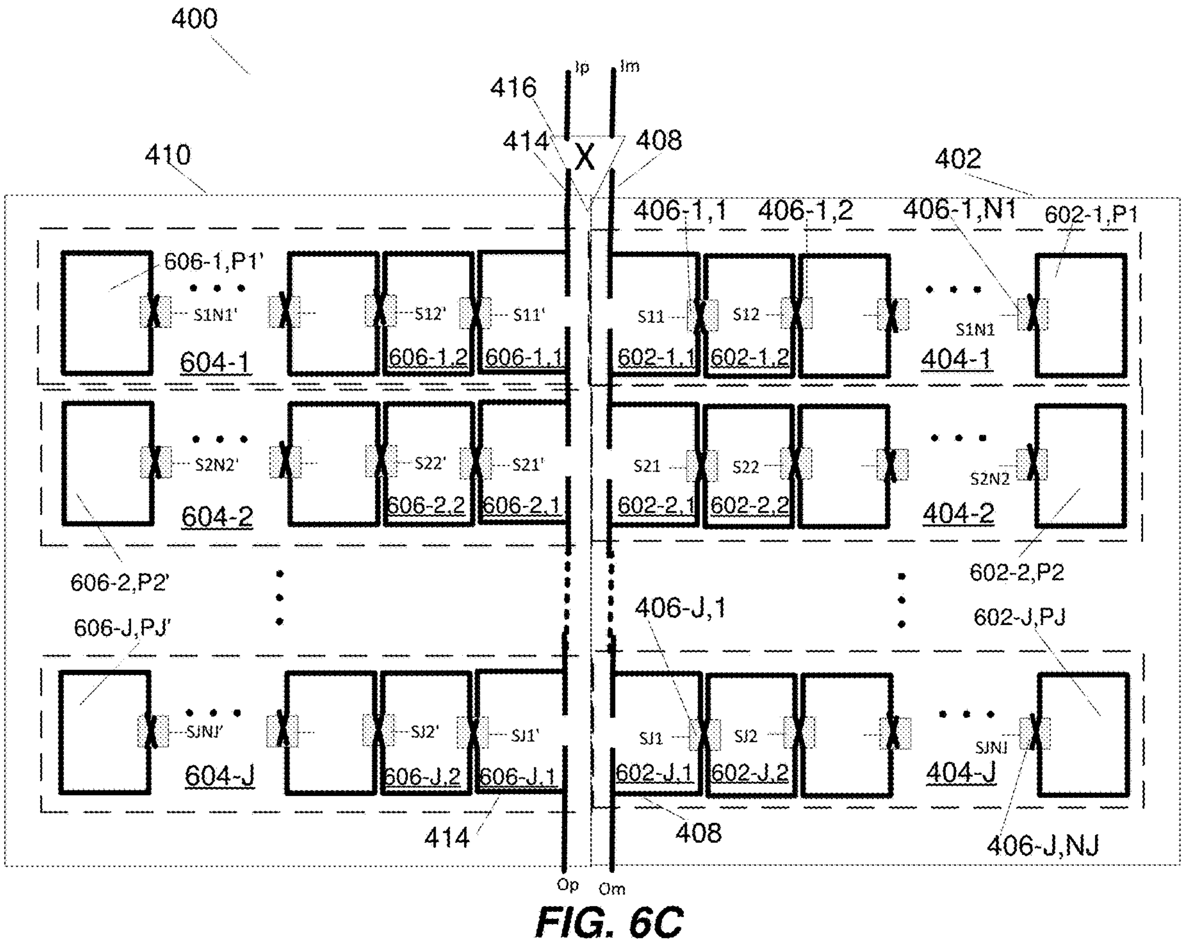

FIGS. 6A, 6B, and 6C illustrate another example layout of a true-time phase shifter 400 according to some aspects of this disclosure. FIG. 6A illustrates an example of portion 402 of phase shifter 400 where meandering transmission line 408 forms a plurality of loops 602 in each of cascaded segments 404. Switches 406 can then be arranged where adjacent loops intersect and cross to direct current into the next loop or bypass the next, and subsequent, loops thereby shortening the length of meandering transmission line 408 in that segment 404.

As shown in FIG. 6A, segment 404-1 includes loops 602-1,1 through 602-1, P1, where P1 is the number of loops 602 formed in segment 404-1. Similarly, loops 602-2,1 through 602-2,P2 are formed in segment 404-2 and loops 602-J,1 through 602-J,PJ are formed in segment 404-J. P1 through PJ indicate the number of loops formed in segments 404-1 through 404-J, respectively. In some embodiments, a switch 406 is positioned at the intersection of each of the loops, in which case the number of loops in each segment Pj is one more than the number of switches Nj. In some embodiments, the switches are positioned at only certain ones of the intersections of adjacent loops and the remaining intersections are left open. In the example illustrated in FIG. 6A, each of the intersections includes a switch 406. As is illustrated in FIG. 6A, and further in FIGS. 6D and 6E, switches 406 are connected or disconnected depending on whether the next and subsequent loops are bypassed in phase shifter 400 or whether they are included in phase shifter 400.

Figure 6D:
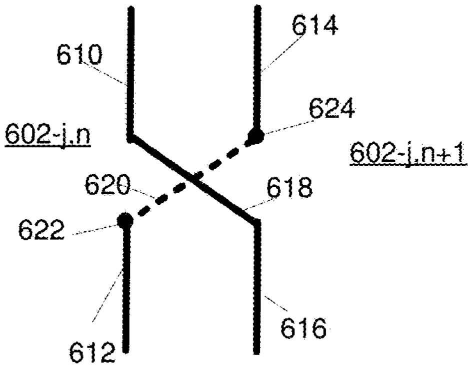
FIGS. 6D and 6E illustrate the intersection between adjacent loops as illustrated in FIGS. 6A through 6C.
Figure 6E:
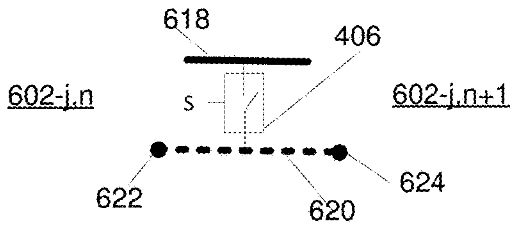

FIGS. 6D and 6E illustrate switching at the intersection between two adjacent loops, loops 602-*j*,*n* and 602-*j*,*n*+1. FIG. 6D illustrates a planar view of an intersection between adjacent loops 602 (loops 602-*j*,*n* and 602-*j*,*n*+1 where j and n represent an arbitrary one of loops 602). As is illustrated in FIG. 6D, sections 610 and 612 illustrate sections of meandering transmission line 408 that is part of loop 602-*j*,*n* and sections 614 and 616 illustrate sections of meandering transmission line 408 that is part of the adjacent loop 602-*j*,*n*+1. Section 610 is connected with section 616 through section 618. Section 612 is connected to section 614 through section 620. As shown in FIG. 6D, one of the two sections (618 or 620) is shifted vertically with vias 622 and 624. In FIG. 6D, section 620 is illustrated as being vertically shifted to another metallization layer as an example. FIG. 6E illustrates a vertical representation of the intersection illustrated in FIG. 6D. As illustrated in FIG. 6E, switch 406 is positioned between sections 618 and 620 so that, when switch 406 is engaged, sections 618 and 620 are connected and loop 502-*j*,*n*+1 is bypassed. Switch 406 can be, for example, the switch illustrated in FIG. 5E. As discussed above, when switch 406 is open, switch 406 can provide a capacitance. In examples where intersections do not include switch 406, a capacitance may be provided between sections 618 and 620.

Consequently, as shown in FIG. 6A, loops 602-1,2 through 602-1,P1 can be bypassed in section 404-1 by activating the appropriate one of 406-1,1 through 406-1,N1, thereby adjusting the length of meandering transmission line 408 in segment 404-1. Similarly, loops 602-2,2 through 602-2,P2 can be bypassed by switches 406-2,1 through 406-2,N2 to shorten the length of meandering transmission line 408 in segment 404-2 and loops 602-J,2 through 602-J,PJ can be bypassed by activating the appropriate one of switches 406-J,1 through 406-J,NJ in segment 404-J. As is illustrated, activating one of switches 406, for example switch 406-1,*n*, bypasses all of loop the loops connected through that switch in that section, for example 602-1,*n*+1 through 602-1,P1 in this example. Consequently, the length of meandering transmission line 408, and therefore the phase introduced by phase shifter 400, can be adjusted by adjusting the number of loops included in each of segment 404.

In the example illustrated in FIG. 6A, adjacent loops 602 can be configured to reduce magnetic coupling between sections of meandering transmission line 408. Further, each of segments 404-1 through 404-J can provide a phase shift that depends on the number of loops 602 that are included in each segment 404. Although loops 602 illustrated in FIG. 6A are square, any geometric shape can be used (e.g., circular, elliptical, etc.) to form loops 602.

FIG. 6B illustrates a planar layout of a single-ended phase shifter 400 that includes portion 402 and portion 410 arranged relative to portion 402. As is illustrated in FIG. 6B, meandering transmission line 414 of portion 410 is connected with meandering transmission line 408 of portion 402 to form a meandering transmission line that runs through both portions 402 and 410.

As illustrated in FIG. 6B, portion 410 can include J segments 604-1 through 604-J where meandering transmission line 414 forms loops 606-1,1 through 606-J, NJ' in segments 604-1 through 6004-J. Further, the intersections between adjacent loops may include switches 608-1,1 through 608-J,NJ', as is illustrated in FIGS. 6D and 6E. In some embodiments, portion 410 can be a mirror image of portion 402.

In one particular example true-time phase shifter 400 as illustrated in FIG. 6B, portion 402 includes three cascaded segments 404, each of which includes three loops 602. Similarly, portion 410 is a mirror image of portion 402. Each of segments 404-1 through 404-3 and 604-1 through 604-3 can be tuned to provide a particular phase shift, e.g. 14 degrees. As is illustrated in the planar layout of FIG. 6B, and in the cross-over layouts provided in FIGS. 6D and 6E, the meandering transmission line formed by meandering transmission lines 408 and 416 can be formed in a metallization layer with 3 μm copper, with an underpass formed using vias. In the metallization, a ground structure can be provided that surrounds phase shifter 400. In a particular example, the total area of the resulting structure can be 233 μm×326 μm and may provide for about a 5 bit phase shifter resolution. Since the structure is bi-directional, phase shifter 400 can be shared between the transmitter and the receiver, as is illustrated in FIG. 3B.

In some examples, use of a slow wave structure (which may include the ground structure discussed above) may shrink the size of the structure significantly, for example up to 20 percent. A slow wave structure refers to a transmission line in which the RF microwave travels with a phase velocity equal to or less than predesignated velocity of wave propagation.

FIG. 6C illustrates a planar layout of a differential phase shifter 400. As illustrated in FIG. 6C, a differential signal is applied on meandering transmission line 414 of portion 410 and meandering transmission line 408 of portion 402. A differential output is provided at the opposite ends of meandering transmission lines 408 and 414. Portions 410 and 402 are discussed above with respect to FIG. 6B. In some examples a cross-over switch 416 can be provided either on the input or on the output to provide a further 180° phase shift to the signal. Cross-over switch 416 may be as described with FIG. 5D.

Figure 7A:
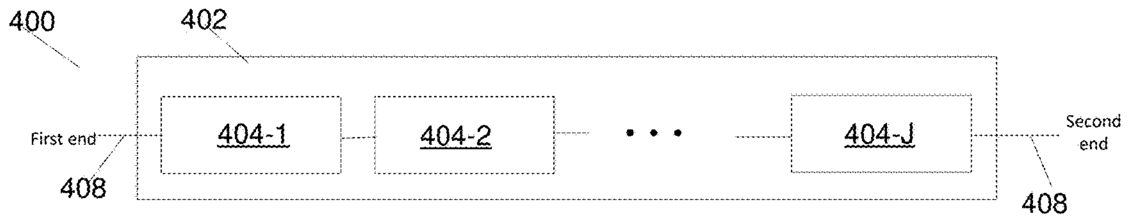
FIGS. 7A through 7G illustrate another example of a true-time phase shifter as illustrated in FIGS. 4A through 4C.

FIGS. 7A through 7E illustrate another example of a phase shifter 400 according to some aspects of the present invention. In the example illustrated in FIGS. 7A through 7E, the effective electrical length of the meandering transmission line is adjusted by selectively inductively coupling, with switches, another inductor positioned adjacent to the meandering transmission line, as is discussed further below. FIG. 7A illustrated portion 402 of phase shifter 400. As illustrated in FIG. 7A, portion 402 includes cascaded segments 404-1 through 404-J, as has been discussed above.

Figure 7B:
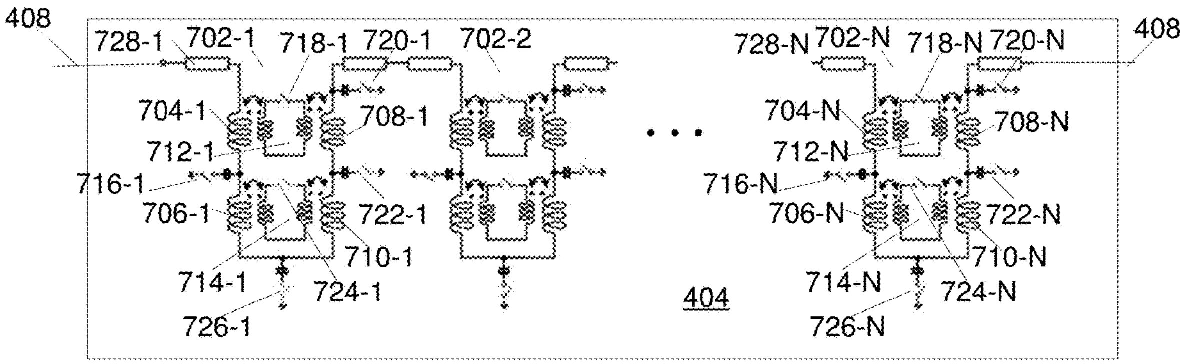

FIG. 7B illustrates an example segment 404, which is one of segments 404-1 through 404-J. As illustrated in FIG. 7B, meandering transmission line 408 forms series coupled elements 702-1 through 702-N. As illustrated in element 702-1, for example, meandering transmission line 408 forms inductors 704-1, 706-1, 708-1, and 710-1. As discussed further below, inductors 704-1, 706-1, 708-1, and 710-1 can form an "8-shaped" section of meandering transmission line 408. A first inductor 712-1 is formed proximate to inductors 704-1 and 708-1 and a second inductor 714-1 is formed proximate to inductors 706-1 and 710-1. First induction 712-1 is switched on or off with a switch 718-1 while second inductor 714-1 is switched on or off with a switch 724-1.

Switch 718-1 is operated with switches 716-1 and 720-1. Switch 716-1 is configured to provide a larger capacitance to ground at a node between inductors 704-1 and 706-1 when switch 718-1 is off. Switch 720-1 is configured to provide a larger capacitance to ground on inductor 708-1 when switch 718-1 is off. Similarly, switch 724-1 is operated with switches 722-1 and 726-1. Switch 722-1 is configured to provide a larger capacitance to ground on a node between inductors 708-1 and 710-1 when switch 724-1 is off. Switch 726-1 is configured to provide a larger capacitance to ground on a node between inductors 706-1 and 710-1 when switch 724-1 is off.

Figure 7D:
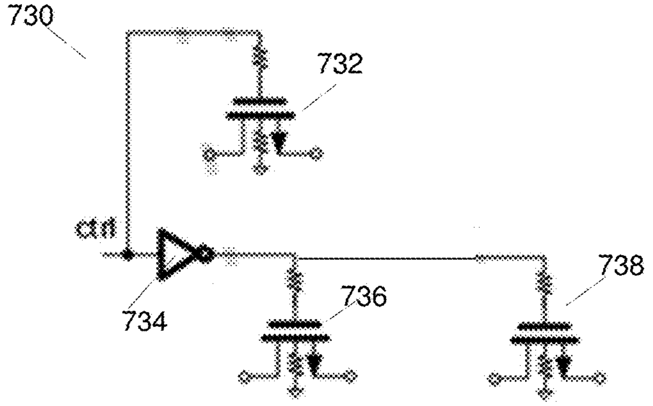
Figure 7C:
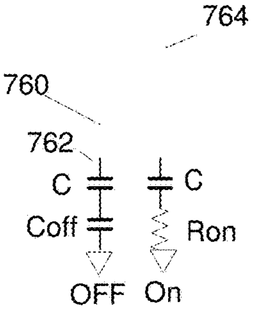

The operation of a switch 760, which may illustrate operation of one of switches 716, 720, 722, and 726, is further illustrated in FIG. 7C. As illustrated in FIG. 7C, switch 760 can be in an on state 762 or an off state 764. When switch 760 is in OFF state 762, switch 760 provides a capacitance Coff, the off capacitance of the transistor, in series with a capacitance C. In ON state 764, then the switch 760 provides a resistance Ron, the on resistance of switch transistor 760, in series with a capacitance C. Consequently, a smaller capacitance is provided when switch 760 is in off state 762 than when it is in on state 764.

FIG. 7D illustrates an example switch arrangement 730 that can be used in an element 702 as illustrated above. Each section 702 can include two switch arrangements 730. Switch arrangement 730 further represents switch 406 as illustrated in FIG. 4A, for example. As illustrated in FIG. 7D, a transistor 732 is connected to a control signal cntrl. Transistor 732 can be switch 718-1 or can be switch 724-1 illustrated in element 702-1 in FIG. 7B. As shown in FIG. 7D, the control signal ctrl is input to an inverter 734 and provided to the gates of transistors 736 and 738. Transistor 736, for example, can be switch 716-1 or switch 726-1. Transistor 738 can be switch 720-1 or switch 726-1. Consequently, switch arrangement 730 can illustrate switches 718, 716, and 720 or can be switches 724, 722, and 726, as illustrated in FIG. 7B.

In some examples, the components can be illustrating component inductances L, quality factors Q, coupling parameters k, and capacitances C. For example, in one example inductance unit L is 20 pH, the resonant quality factor QL is 20, the coupling constant k between inductors 712 and 714 and the counterpart inductors 704, 708 and 706, 710 can be 0.5, and the capacitances that are part of switches 716, 726, 722, and 720 can be C=7.1 fF. Transistor sizes of switching transistors 732, 736, and 738 of switching circuit 730 can be optimized appropriately.

Consequently, as is illustrated in FIGS. 7A and 7B, the effective electrical length of meandering transmission line 408 can be adjusted by switching, at each of elements 702-1 through 702-N, additional inductively coupled inductance to the inductance formed by meandering transmission line 408. Further, if the switches are set such that the additional inductance is not switched on, then capacitances are switched on that can help maintain the impedance of meandering transmission line 408. FIG. 7B illustrates elements 702 that include a single figure-8 structure. However, as discussed further below, element 702 may include any number of figure-8 structures.

Figure 7E:
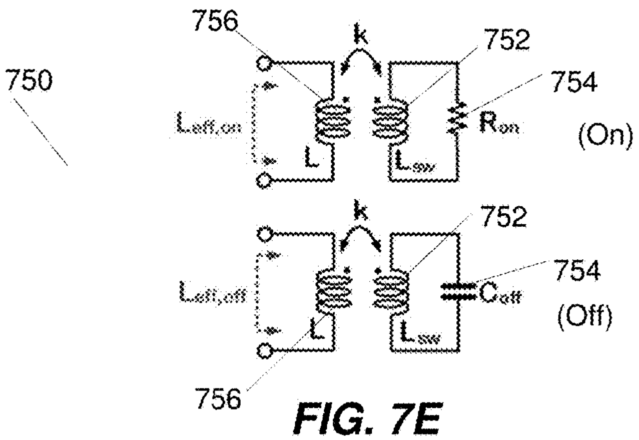

FIG. 7E depicts coupling inductances with switches 718 or 724 in the on and in the off state. In particular, transistor 756 may represent inductors 704 and 708 and inductor 752 represents inductance 712, for example. In which case, switch 754 represents switch 718. As discussed above, a phase shift can occur when switch 754 is switched on or off. As illustrated in FIG. 7E, which switch 754 is on the switch presents a resistance Ron, while when switch 754 is off the switch presents a capacitance Coff. The inductance of inductor 756 is designated as L and the inductance of inductor 752 is Lsw.

Consequently, when switch 754 is on, the effective inductance in the on and off state can be given by $$L_{eff,on} = (1 - k^2)L$$

$$L_{eff,off} = \left(1 + k^2 \frac{\omega^2}{\omega_{sw,off}^2}\right)L$$

By pairing ($C_{eff,off}$ and $L_{eff,on}$) and ($C_{eff,on}$ and $L_{eff,off}$), different phase shifts can be obtained such the time delay is proportional to $\sqrt{LC}$. Also, the characteristic impedance of the transmission line, $\sqrt{L/C}$, can be kept constant at the same time. Furthermore, since $Q_{Ceff,on} < Q_{Ceff,off}$ and $Q_{Leff,on} < Q_{Leff,off}$, the loss between low and high delay can be minimized without adding additional loss to low loss states.

Figure 7F:
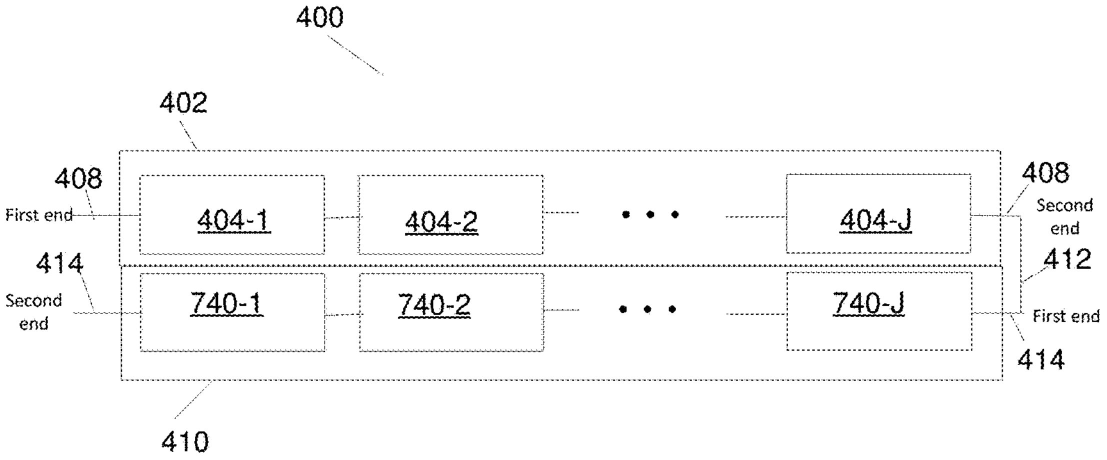
Figure 7G:
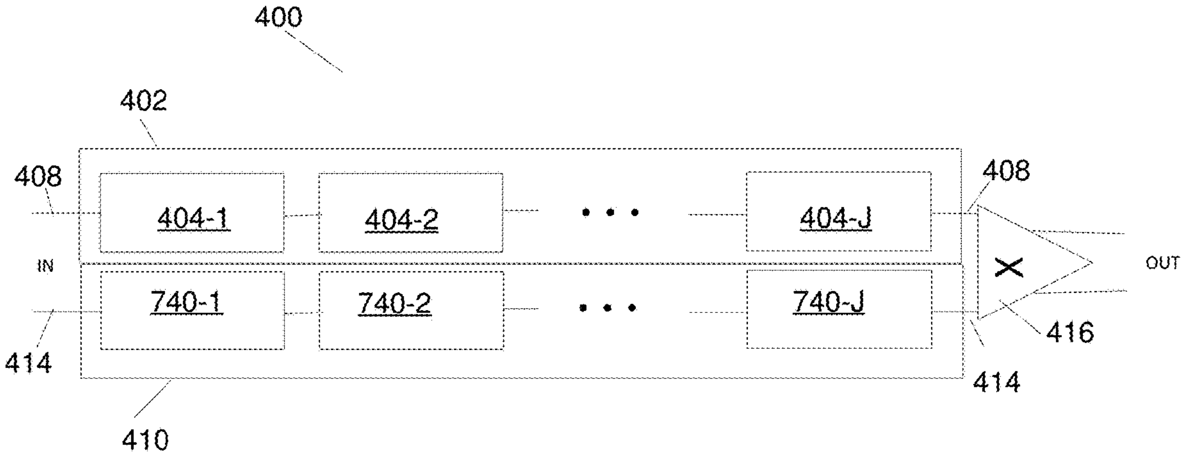

FIGS. 7F and 7G illustrate examples of phase shifter 400. As shown in FIGS. 7F and 7G, portion 402 is combined with portion 410 to form phase shifter 400. Portion 410 includes meandering transmission line 414 is arranged through segments 740-1 through 740-J, which are structurally similar to segments 404-1 through 404-J. In some examples, segments 740-1 through 740-J are mirror images of segments 404-1 through 404-J. In FIG. 7F, phase shifter 400 is a singled-ended phase shifter where meandering transmission line 408 is connected to meandering transmission line 414 at connection 412. In FIG. 7G, phase shifter 400 is a differential phase shifter where an input signal is provided between meandering transmission line 408 and meandering transmission line 414. The output signal, in this example, can be input to cross-over switch 416 that provides an extra 180° phase shift. As has been discussed above, cross-over switch 416 can be provided on the input side of phase shifter 400.

Figure 8A:
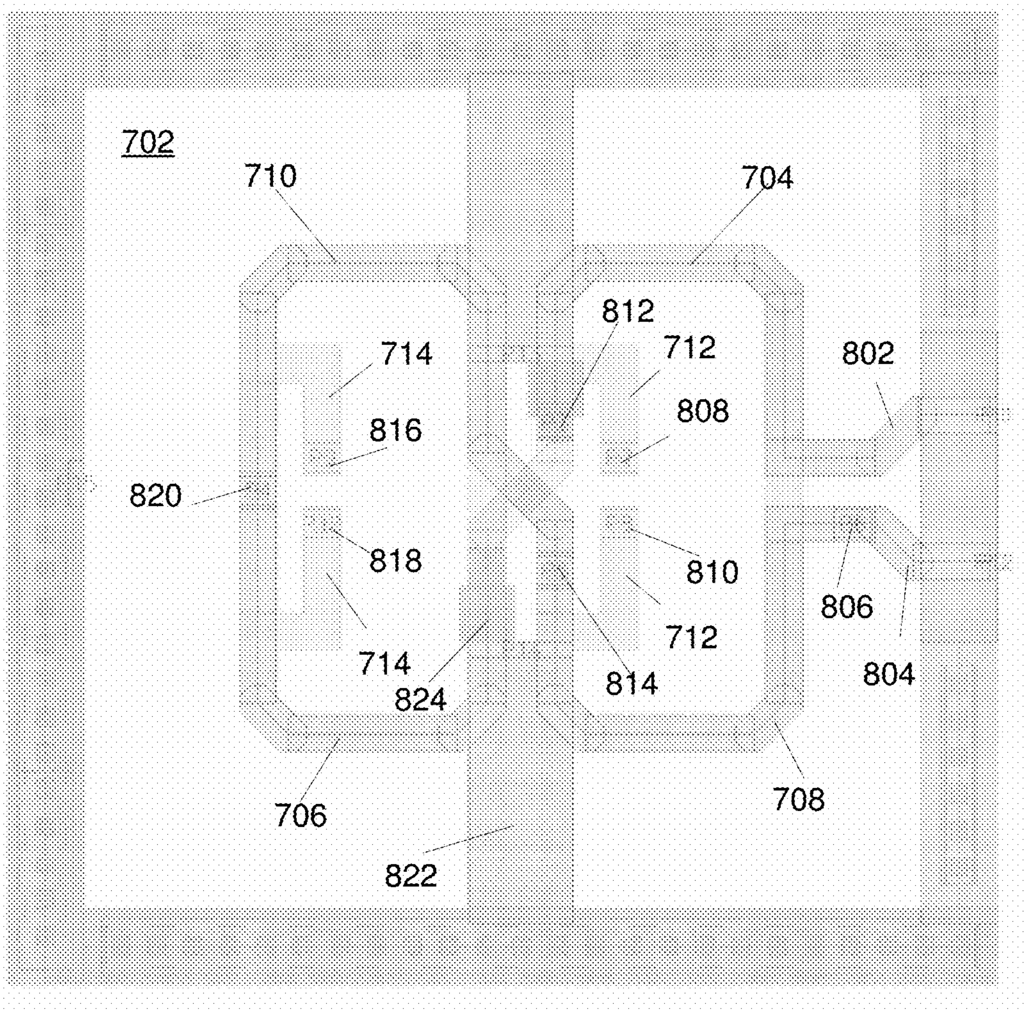
FIGS. 8A through 8F illustrate the example illustrated in FIGS. 7A through 7F.

FIGS. 8A through 8F illustrate production of one of elements 702 according to some aspects of this disclosure. Element 702 as illustrated in FIG. 8A can be formed with four (4) metallization layers that further includes three (3) via layers, which are illustrated in FIGS. 8B-8E. As illustrated in FIG. 8A, inductors 704 and 708 form one loop and inductors 710 and 706 form a second loop of a FIG. 8 shaped structure. FIG. 8A further illustrates an input section 802 and output section 804 of the meandering transmission line 408 that forms the structure of element 702. Via points 808 and 810 can allow connection for inductance 712 to switch 718 as illustrated in FIG. 7B. Via points 816 and 818 can allow connection for inductance 714 to switch 724. Via point 806 allows for connection to switch 720. Via point 814 can allow connection to switch 722. Via point 812 can allow connection to switch 726. Via point 820 allows connection to switch 726. FIG. 8A also illustrates a ground layer 822. And via point 824, which is used to connect inductor 704 with inductor 706 in the figure-8 structure. It should be noted that via points 806, 812, 814, and 820 may include capacitances that are provided with associated switches 720, 716, 726, and 716, respectively, as well.

As discussed above, element 702 illustrated in FIG. 8A can be formed with four stacked metallization layers formed on a semiconductor structure. The semiconductor structure can, for example, include transistors, capacitors, and other components. The four metallization layers can be separated by deposition of insulator layers, such as $SiO_2$ for example. In particular, FIG. 8A illustrates an embodiment with a single 8-shape inductor.

Figure 8B:
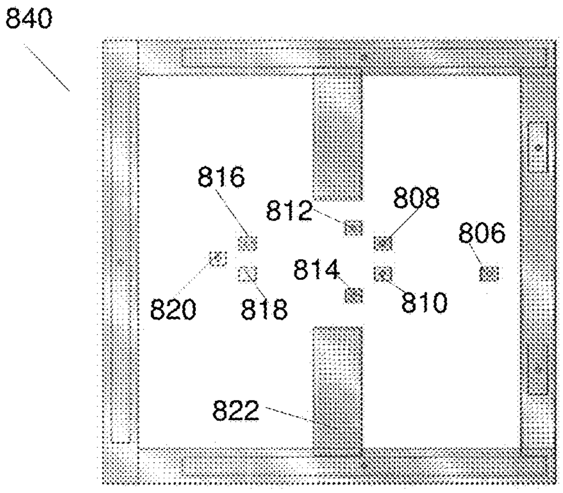

FIG. 8B illustrates a planar view of a ground metallization 840 that supplies ground layer 822. Additionally, metallization for via points 806, 808, 810, 812, 814, 816, 818, 820, and 824 are included in ground metallization 840, which can be connected to components in the underlying semiconductor layer (e.g. switches). Capacitors may be formed in the metallization layers as well (MOMcaps), with switches formed in the underlying semiconductor layers (i.e., capacitance may be built into via structures as described).

Figure 8C:
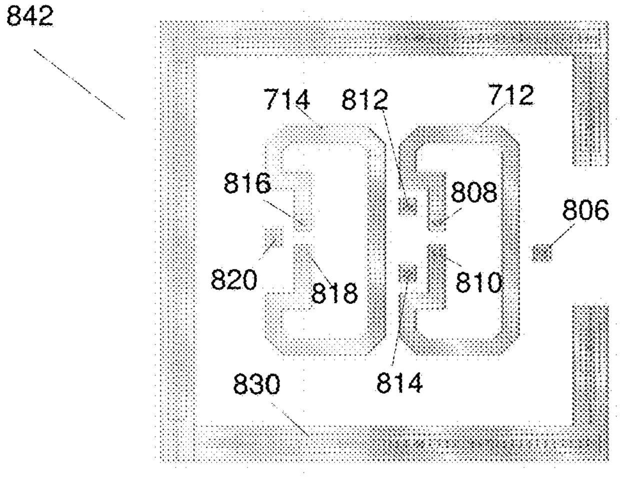

FIG. 8C illustrates a second metallization layer 842 that can be provided over metallization layer 840 illustrated in FIG. 8B. As illustrated, metallization layer 842 includes inductors 712 and 714. As is further shown, vias 816 and 818 as well as vias 808 and 810 can connected to switches 724 and 718, respectively, that are formed in the underlying semiconductor layer. Further, a ground metallization 830 can be formed in metallization layer 842 and coupled to ground 822 through further vias.

Figure 8D:
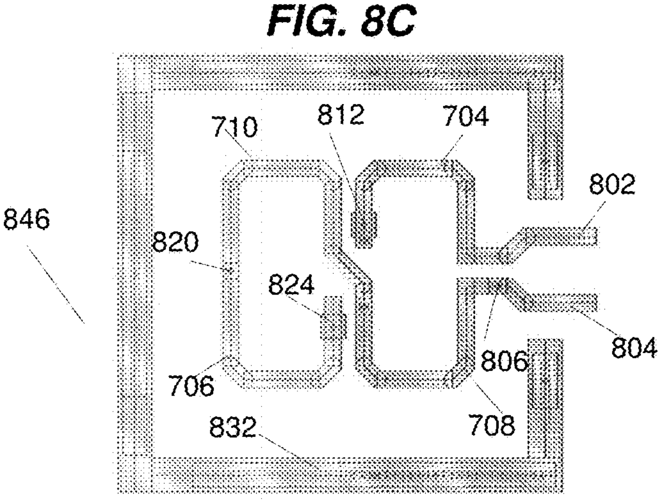

FIG. 8D illustrates metallization layer 846, which includes inductors 704, 706, 708, and 710 as illustrated in FIG. 7B, as well as input and output sections 802 and 804 as illustrated in FIG. 8A. As is further illustrated in FIG. 8D, via points 806, 812, 820, and 824 may provide connections to switches formed in the underlying semiconductor. Additionally, a ground 832 can be attached to ground 830 of metallization layer 844 through vias.

Figure 8E:
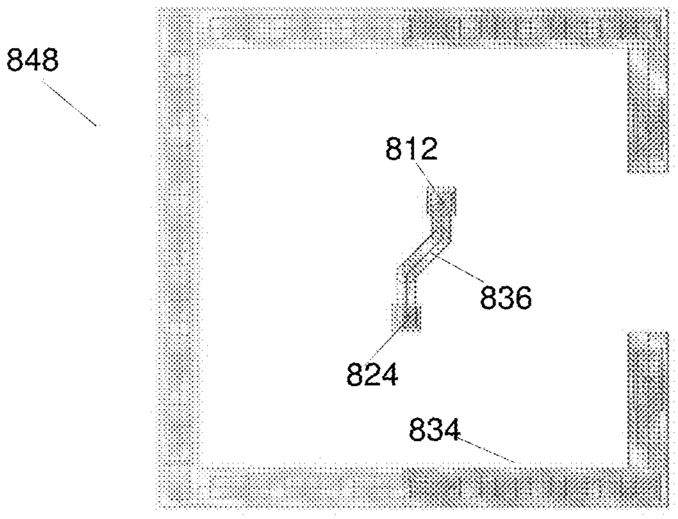

FIG. 8E illustrates the fourth metallization layer 848. As illustrated, layer 848 metallization layer 848 includes a connection section 836 that, through vias 812 and 824, connect inductor 704 with inductor 706 to complete the meandering transmission line. Again, metallization layer 848 includes ground 834, which is connected to ground 832 of metallization layer 846 through vias.

Figure 8F:
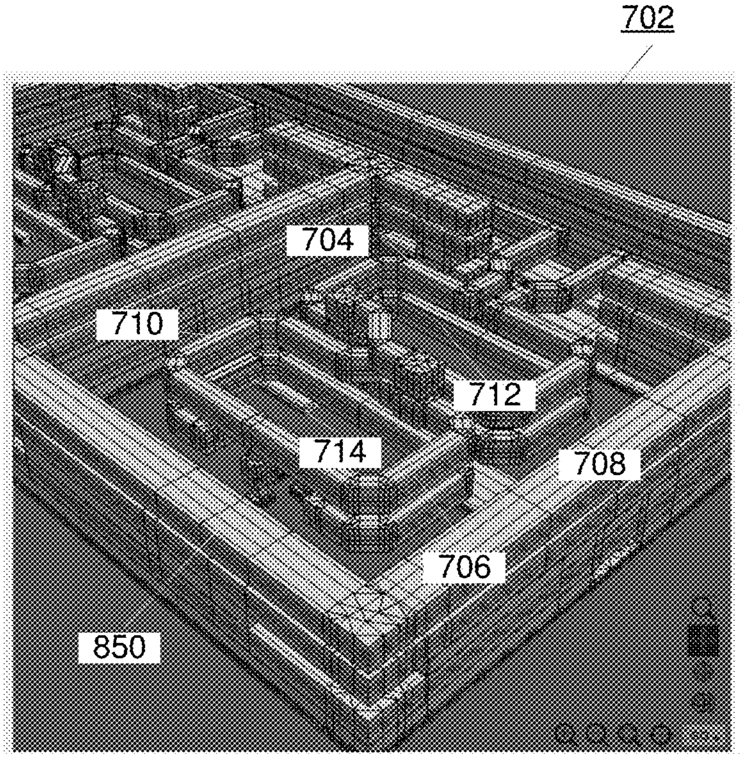

FIG. 8F illustrates a 3-D rendering of the metallization layers to form element 702. FIG. 8F further illustrates ground structure 850, which is formed by connecting grounds 822 from FIG. 8B, 830 from FIG. 8C, 832 from FIG. 8D, and 834 from FIG. 8A.

In a particular example, metallization layer 840 illustrated in FIG. 8B can be formed with about one (1)μm thick copper. Metallization layers 842 and 846 of FIGS. 8C and 8D can be formed with about 3 μm copper. Metallization layer 848 of FIG. 8E can be formed with about 2.8 μm copper or 2.8 μm thick aluminum.

Figure 9A:
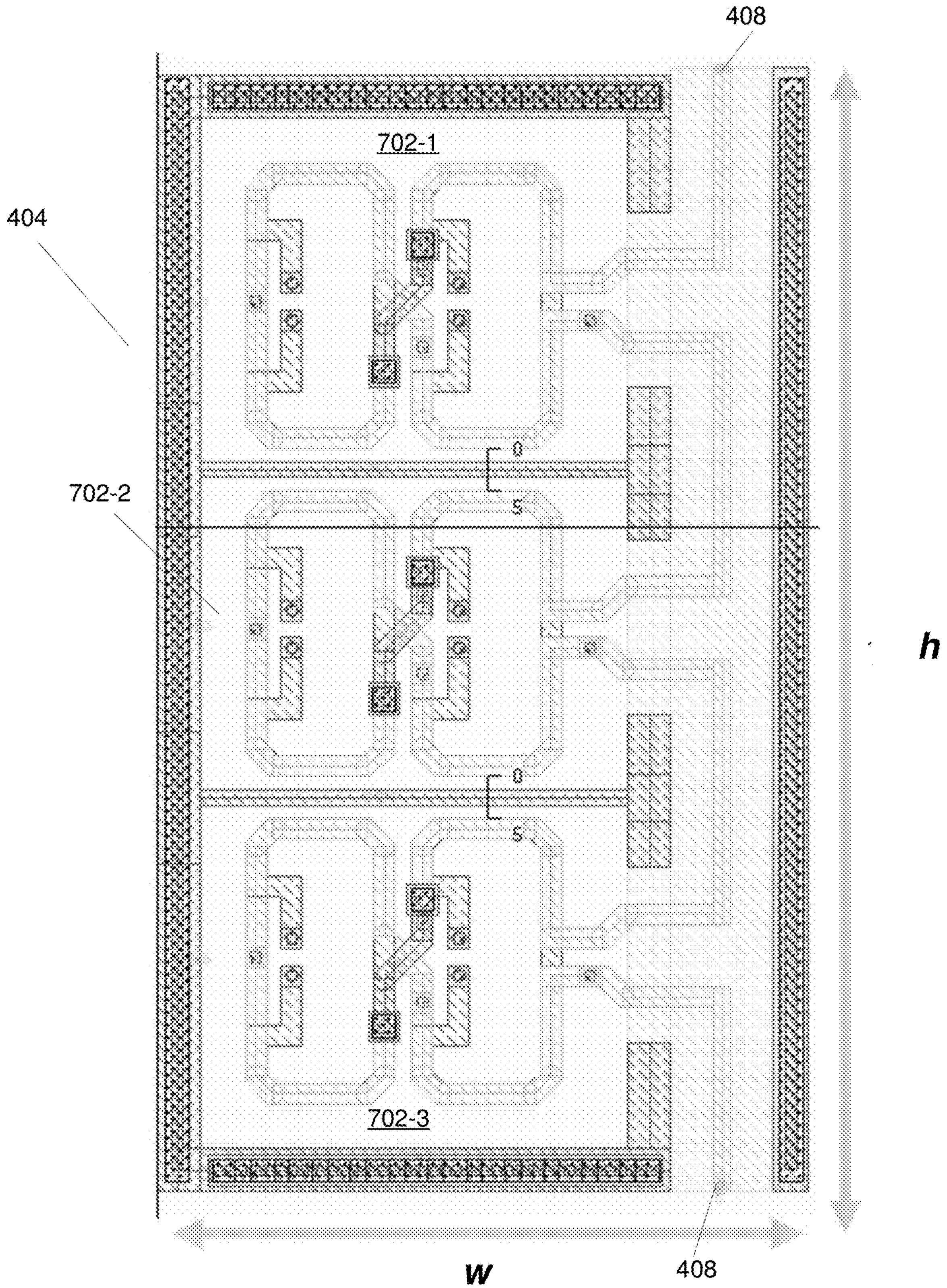
FIGS. 9A and 9B illustrate example configurations of elements of the example illustrated in FIGS. 7A through 7F and FIGS. 8A through 8F.

FIG. 9A illustrates a planar view of a segment 404 that includes three elements 702-1, 702-2, and 702-3 as illustrated about in FIGS. 8A-8F. In one particular embodiment, portion 402 of phase shifter 400 can be formed with three segments 404-1 through 404-3 each having three elements 702-1 through 702-3 as illustrated in FIG. 9A. The size of segment 404 can be, for example, w=77 μm and h=132 μm, when designed for operation at 145 GHz center frequency. In a phase shifter using this construction, for example, simulated results predict that a total phase range of 19.6 degrees with 2-bit phase control in each segment 404 can be achieved. The phase resolution can be about 10 degrees per step (i.e. switch configuration), which is close to a 5-bit phase shifter resolution. Gain variation across four states was 0.32 dB, however, gain variation can be further optimized by tuning the switch size and shunt capacitance. In some examples of phase shifter 400 as illustrated in FIG. 9A, nearly a 180 degree phase range can be covered with loss variation of between about −11 dB and −16 dB. Consequently, the configuration of segment 404 as illustrated in FIG. 9A can be useful.

Figure 9B:
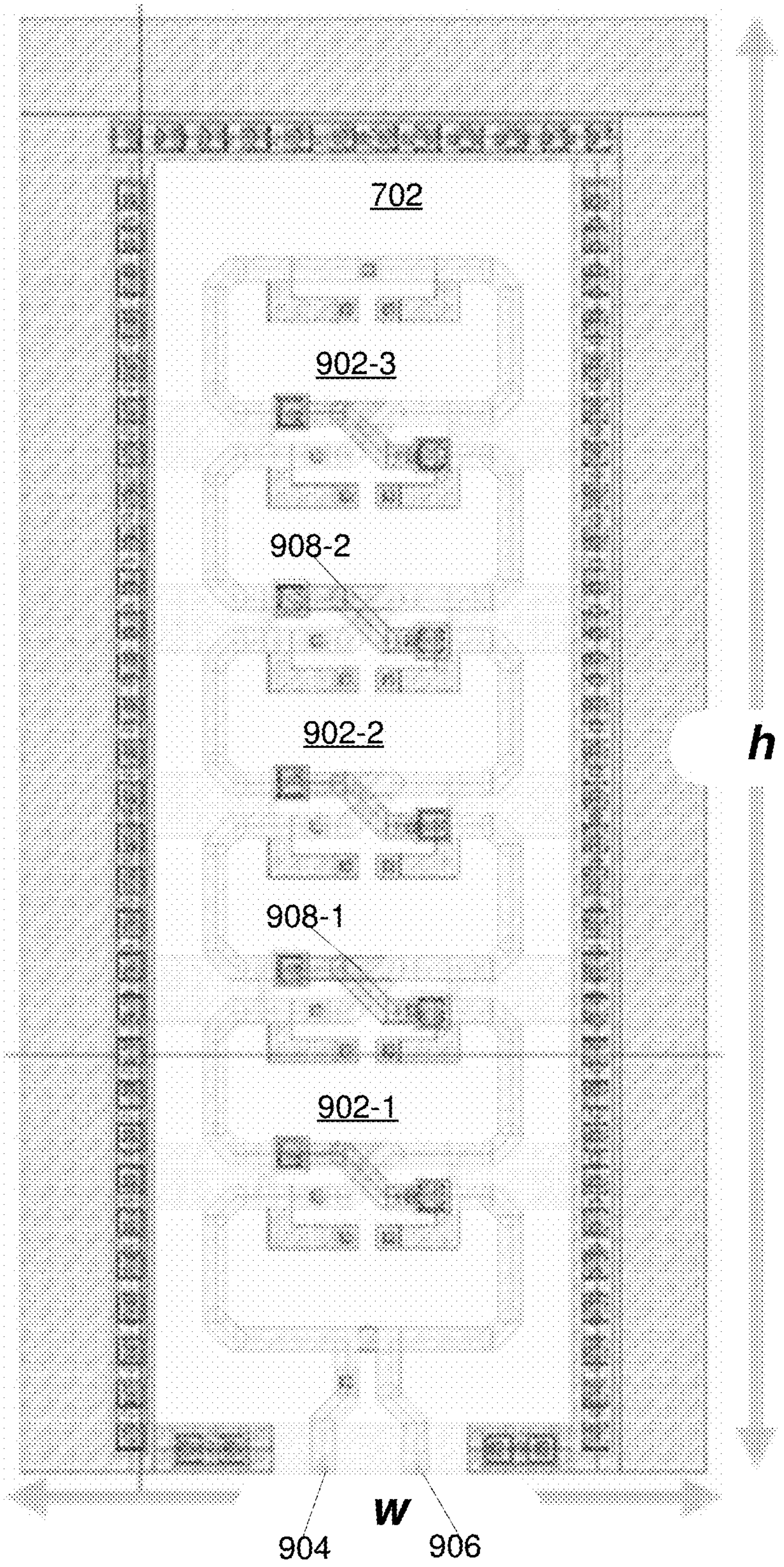

FIG. 9B illustrates a planar view of an element 702 that includes more than one figure-8 structure in each element 702. As illustrated in the example of FIG. 9B, figure-8 structures 902-1 through 902-3 are coupled in series and connected with structures 908-1 through 908-2. Consequently, signals on ends 904 and 906 of meandering transmission line 408 pass through structures 902-1 through 902-3. FIG. 9B illustrates section 702 with three figure-8 structures 902, but any number of figure-8 structures 902 can be included. In such a structure, the phase shift range may not be increased but the resolution that can be achieved can be increased. Greater loss and loss variations may be expected in this structure due to a longer transmission path.

Figure 10:
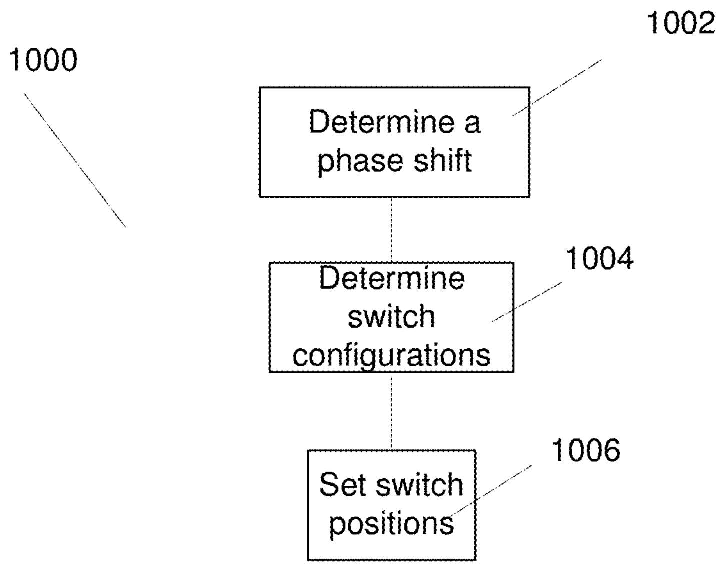
FIG. 10 illustrates operation of a phase shifter as illustrated in FIGS. 4A through 4C.

FIG. 10 illustrates a method 1000 of operation of a phase shifter 400 as disclosed here. Method 1000 starts with a determination of a phase shift desired for phase shifter 400 in step 1002. As discussed previously, the desired phase shift may be determined by control signals received from data processor 210 as illustrated in FIG. 2B. In step 1004, switch configurations for switches 406 are determined. As discussed above, switch configurations can be determined during optimization of phase shifter 400. In step 1006, the switch positions are set for operation of phase shifter 400.

The circuit architecture described herein described herein may be implemented on one or more ICs, analog ICs, RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Consequently, as described above, various aspects of the disclosure are provided. In particular, the following aspects are disclosed.

Aspect 1 provides a phase shifter that includes a first meandering transmission line having a first input configured to receive a first input signal and a first output configured to provide a first output signal; and a plurality of switches configured to adjust an effective electrical length of the first meandering transmission line.

Aspect 2 provides for the phase shifter of aspect 1, wherein the first meandering transmission line forms a plurality of segments and wherein at least one of the plurality of switches is positioned within each of the plurality of segments to adjust a size of the segment, thereby adjusting the effective electrical length of the first meandering transmission line.

Aspect 3 provides for the phase shifter of aspect 2, wherein the plurality of segments are each formed from a “U-shaped” portion of the first meandering transmission line and are cascaded, wherein the plurality of switches are arranged interior to each of the plurality of segments to shorten the “U-shaped” portion when closed.

Aspect 4 provides for the phase shifter of aspect 2, wherein each of the plurality of segments includes a plurality of loops formed in the first meandering transmission line, wherein one of the plurality of switches is positioned at each intersection of the first meandering transmission line linking adjoining loops in each segment, the switches in each of the plurality of segments determining a number of the plurality of loops in that segment that are engaged to carry current, thereby controlling an electrical length of the segment by controlling a number of loops engaged in each segment.

Aspect 5 provides for the phase shifter of aspect 4, wherein adjoining loops of the plurality of loops in each of the plurality of segments that are engaged carry current in opposite directions, thereby canceling fields generated by each of the plurality of loops in each of the plurality of segments.

Aspect 6 provides for the phase shifter of aspect 2, wherein each of the plurality of segments includes a plurality of loops formed in the first meandering transmission line, wherein one or more of the plurality of switches is configured to selectively control addition of an additional inductance to one or more of the plurality of loops.

Aspect 7 provides for the phase shifter of aspect 6, wherein the additional inductance includes an additional loop of conductive material that is configured with respect to each of the plurality of loops to inductively couple to that loop when engaged by the one or more of the plurality of switches.

Aspect 8 provides for the phase shifter of aspect 2, wherein the plurality of segments include a first set of segments and a second set of segments, the second set of segments being mirrored from the first set of segments and placed relative to the first set of segments to reduce coupling between segments of the plurality of segments.

Aspect 9 provides for the phase shifter of aspect 2, wherein an off capacitance is supplied by each of the at least one of the plurality of switches positioned within each of the plurality of segments such that a capacitance of each segment is changed when each of the plurality of switches is turned on or turned off.

Aspect 10 provides for the phase shifter of aspect 9, wherein a real impedance of each of the plurality of segments provides a desired effective impedance of the phase shifter.

Aspect 11 provides for the phase shifter of aspect 10, wherein a switch size and a width of first the meandering transmission line is varied along the first meandering transmission line to optimize an impedance to maintain the desired effective impedance across phase states.

Aspect 12 provides for the phase shifter of aspect 2, wherein a switching sequence of the plurality of switches is configured to optimize the phase shifter.

Aspect 13 provides for the phase shifter of aspect 12, wherein optimization is determined according to a behavioral model.

Aspect 14 provides for the phase shifter of aspect 12, wherein optimization includes optimizing a characteristic impedance.

Aspect 15 provides for the phase shifter of aspect 2, wherein each segment provides a phase shift to the first input signal.

Aspect 16 provides for the phase shifter of any of aspects 1 through 15, wherein the phase shifter is a true time phase shifter.

Aspect 17 provides for the phase shifter of any of aspects 1 through 16, further including an active phase inverter coupled to the first meandering transmission line.

Aspect 18 provides for the phase shifter of any of aspects 1 through 17, further including a second meandering transmission line having a second input receiving a second input signal and a second output configured to provide a second output signal; and a plurality of second switches configured to adjust a second effective electrical length of the second meandering transmission line, wherein the first input signal and the second input signal are a differential input signal, and wherein the first output signal and the second output signal form a differential output signal.

Aspect 19 provides for the phase shifter of aspect 18, wherein the first meandering transmission line and the second meandering transmission lines are mirror images of each other.

Aspect 20 provides for the phase shifter of aspect 18, wherein an inverting cross-switch is coupled to the phase.

Aspect 21 provides for the phase shifter of aspect 18, wherein the phase shifter formed by the first meandering transmission line and the second meandering transmission line is bi-directional and is coupled to a bi-directional buffer, the bi-directional buffer providing transmission signals for transmission in an antenna array and receiving receive signals from the antenna array.

Aspect 22 provides for the phase shifter of aspect 18, wherein the first meandering transmission line and the second meandering transmission line form a true time phase shifter.

Aspect 23 provides for the phase shifter of aspect 22 wherein the true time phase shifter is coupled to an active phase inverter.

Aspect 24 provides for a method for processing a millimeter wave communication signal in a phase-array antenna that includes determining a phase shift appropriate for the millimeter wave communication signal; determining configuration of a plurality of switches configured to adjust an effective electrical length of a first meandering transmission line configured to receive the millimeter wave communication signal; and setting the plurality of switches.

Aspect 25 provides for a phase shifter that includes a meandering transmission line; and means for controlling an effective length of the meandering transmission line.

Although selected aspects have been illustrated and described in detail, it will be understood that various substitutions and alterations may be made therein without departing from the spirit and scope of the present invention, as defined by the following claims.

What is claimed is:

1. A real-time phase shifter, comprising:

a first meandering transmission line having a first input configured to receive a first input signal and a first output configured to provide a first output signal, the first meandering transmission line being formed of a single continuous conductor between the first input and the first output; and a plurality of switches configured to adjust an effective electrical length of the first meandering transmission line, each of the plurality of switches being configured to directly connect two points of the first meandering transmission line, wherein the first meandering transmission line is configured to form a plurality of segments and wherein each segment of the plurality of segments includes at least one of the plurality of switches configured to control the effective electrical length of the first meandering transmission line within the segment by directly connecting two points of the first meandering transmission line in the segment, and wherein each segment provides a portion of a phase shift of the real-time phase shifter.

2. The phase shifter of claim 1, wherein the plurality of segments are each formed from a "U-shaped" portion of the first meandering transmission line and are cascaded, wherein the plurality of switches are arranged interior to each of the plurality of segments to shorten the "U-shaped" portion when closed.

3. The phase shifter of claim 1, wherein each of the plurality of segments includes a plurality of loops formed in the first meandering transmission line, wherein one of the plurality of switches is positioned at each intersection of the first meandering transmission line linking adjoining loops in each segment, the switches in each of the plurality of segments determining a number of the plurality of loops in that segment that are engaged to carry current, thereby controlling a length of the segment by controlling a number of loops engaged in each segment.

4. The phase shifter of claim 3, wherein adjoining loops of the plurality of loops in each of the plurality of segments that are engaged carry current in opposite directions, thereby canceling fields generated by each of the plurality of loops in each of the plurality of segments.

5. The phase shifter of claim 1, wherein the plurality of segments include a first set of segments and a second set of segments, each of the second set of segments being a mirror image of one of the first set of segments and the second set of segments are positioned relative to the first set of segments such that a segment from the first set of segments is positioned relative to the corresponding mirror image of the second set of segments to reduce coupling between segments of the plurality of segments.

6. The phase shifter of claim 1, wherein each of the at least one of the plurality of switches positioned within each of the plurality of segments has an off capacitance such that a capacitance of each segment is changed when each of the plurality of switches is turned on or turned off.

7. The phase shifter of claim 6, wherein a real impedance of each of the plurality of segments provides a desired effective impedance of the phase shifter.

8. The phase shifter of claim 7, wherein a switch size and a width of the first meandering transmission line is varied along the first meandering transmission line to optimize an impedance to maintain the desired effective impedance across phase states.

9. The phase shifter of claim 1, wherein a switching sequence of the plurality of switches is configured to provide the portion of the phase shift for each segment.

10. The phase shifter of claim 9, wherein the configuration of the plurality of switches includes optimizing a characteristic impedance according to a defined cost function.

11. The phase shifter of claim 1, further including an active phase inverter coupled to the first meandering transmission line.

12. The phase shifter of claim 1, further including a second meandering transmission line having a second input receiving a second input signal and a second output configured to provide a second output signal, the second meandering transmission line being formed of a second single continuous conductor between the second input and the second output; and a plurality of second switches configured to adjust a second effective electrical length of the second meandering transmission line, each of the plurality of switches being configured to directly connect two points of the second meandering transmission line, wherein the second meandering transmission line is configured to form a plurality of segments and wherein each segment of the plurality of segments includes at least one of the plurality of second switches configured to control the effective electrical length of the second meandering transmission line with the segment by directly connecting two points of the second meandering transmission line in the segment, wherein the first input signal and the second input signal are a differential input signal, and wherein the first output signal and the second output signal form a differential output signal.

13. The phase shifter of claim 12, wherein the first meandering transmission line and the second meandering transmission lines are mirror images of each other.

14. The phase shifter of claim 12, wherein an inverting cross-switch is coupled to the phase shifter.

15. The phase shifter of claim 12, wherein the phase shifter formed by the first meandering transmission line and the second meandering transmission line is bi-directional and is coupled to a bi-directional buffer, the bi-directional buffer providing transmission signals for transmission in an antenna array and receiving receive signals from the antenna array.

16. The phase shifter of claim 12, wherein the first meandering transmission line and the second meandering transmission line form a true time phase shifter.

17. The phase shifter of claim 16 wherein the true time phase shifter is coupled to an active phase inverter.

18. A method for processing a millimeter wave communication signal in a phase-array antenna, comprising determining a phase shift appropriate for the millimeter wave communication signal;

determining configuration of a plurality of switches configured to adjust an effective electrical length of a first meandering transmission line configured to receive the millimeter wave communication signal; and setting the plurality of switches with the configuration phase shift, wherein the first meandering transmission line is formed of a single continuous conductor between the first input and the first output, and wherein each of the plurality of switches is configured to directly connect two points of the first meandering transmission line, and wherein the first meandering transmission line is configured to form a plurality of segments and wherein each segment of the plurality of segments includes at least one of the plurality of switches configured to control the effective electrical length of the first meandering transmission line within the segment by directly connecting two points of the first meandering transmission line in the segment, and wherein each segment provides a portion of a phase shift of the real-time phase shifter.

19. A phase shifter, comprising:

a meandering transmission line, the meandering transmission line being formed of a single continuous conductor between a first input and a first output; and means for controlling an effective electrical length of the meandering transmission line with a plurality of switches configured to directly connect between two points of the meandering transmission line, wherein the first meandering transmission line is configured to form a plurality of segments and wherein each segment of the plurality of segments includes at least one of the plurality of switches configured to control the effective electrical length of the first meandering transmission line within the segment by directly connecting two points of the first meandering transmission line in the segment, and wherein each segment provides a portion of a phase shift of the real-time phase shifter.

* * * * *